United States Patent

Fukuhara et al.

[11] Patent Number: 5,926,225
[45] Date of Patent: *Jul. 20, 1999

[54] IMAGE CODER WHICH INCLUDES BOTH A SHORT-TERM FRAME MEMORY AND LONG-TERM FRAME MEMORY IN THE LOCAL DECODING LOOP

[75] Inventors: Takahiro Fukuhara; Kohtaro Asai, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/976,956

[22] Filed: Nov. 24, 1997

Related U.S. Application Data

[63] Continuation of application No. 08/740,689, Nov. 1, 1996, abandoned.

[30] Foreign Application Priority Data

Nov. 2, 1995 [JP] Japan .................................. 7-285994
Oct. 22, 1996 [JP] Japan .................................. 8-279641

[51] Int. Cl.⁶ .............................. H04N 7/12; H04N 11/02; H04N 11/04; H04N 5/14
[52] U.S. Cl. ........................................ 348/416; 348/699
[58] Field of Search ................................ 348/169, 170, 348/171, 172, 154, 155, 416, 413, 407, 649, 411, 402, 415

[56] References Cited

U.S. PATENT DOCUMENTS 5,253,054 10/1993 Fujiwara et al. ......................... 358/133
5,317,397 5/1994 Odaka et al. ............................ 348/416
5,606,376 2/1997 Shinohara ................................ 348/701

FOREIGN PATENT DOCUMENTS 6-133299 5/1994 Japan .
6-225288 8/1994 Japan .
6-327003 11/1994 Japan .

OTHER PUBLICATIONS

S. Okubo (1989) NTT Human Interface Laboratories PCSJ89 (pp. 43–48).

*Primary Examiner*—Douglas W. Olms
*Assistant Examiner*—David R Vincent

[57] ABSTRACT

An image coder comprises LTFM 13 storing a local decoded image Gk outputted from an adder 7 a predetermined period of time earlier than the local decoded image Gk stored to STFM 11. The motion compensation of an inputted image Gi is executed in reference to the local decoded image Gk stored by STFM 11 and LTFM 13.

28 Claims, 20 Drawing Sheets

FIG. 15
PATTERN 1
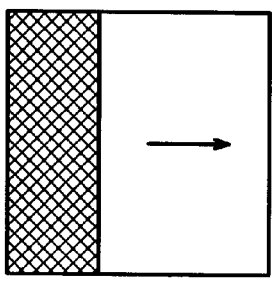
PATTERN 2
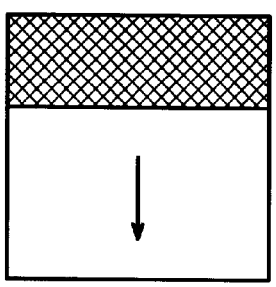
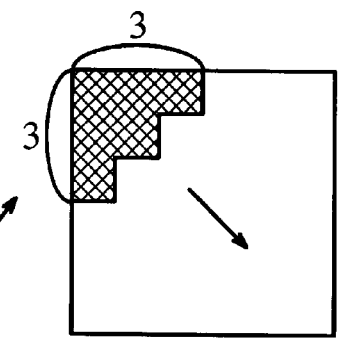
LEVEL=3
PATTERN 3
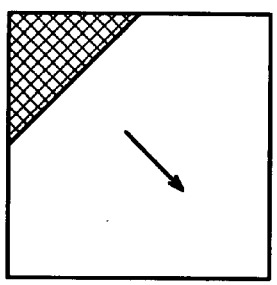
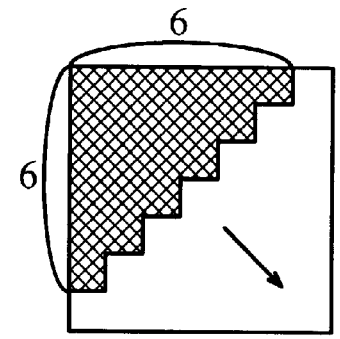
LEVEL=6
PATTERN 4
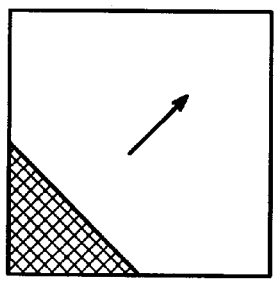

Em

← VARIABLE LENGTH SYMBOL →

Em

| [PREDICTION MODE] | [VARIABLE LENGTH CODE] |
|---|---|
| [1] BLOCK BASE PREDICTION | |
| *REFERENCE FRAME:STFM | 1 |
| *REFERENCE FRAME:LTFM | 0001 |
| *REFERENCE FRAME:LTFM+STFM (INTERPOLATION) | 001 |
| [2] SEGMENT BASE PREDICTION | |
| *REFERENCE FRAME:LTFN or STFM | 01 |

IMAGE CODER WHICH INCLUDES BOTH A SHORT-TERM FRAME MEMORY AND LONG-TERM FRAME MEMORY IN THE LOCAL DECODING LOOP

This application is a continuation, of application Ser. No. 08/740,689 filed on Nov. 1, 1996, now abandoned.

BACKGROUND OF THE INVENTION

1. Field of the Invention

The present invention relates to an image coder and an image decoder which efficiently codes and decodes an inputted image.

2. Description of the Prior Art

FIG. 1 is a block diagram of a conventional image coder disclosed in, for example, the Proceeding of "Standardization on Video Coding for Visual telephony", SAKAE OKUBO, pp. 43–48, 1989, NTT Human Interface Laboratories in the Picture Coding Symposium (PCS J89). In FIG. 1, numeral 1 designates a subtracter for calculating a differential image Gs by subtracting a predicted image Ge from an inputted image Gi, numeral 2 designates a transforming unit for converting, by discrete cosine transformation, the differential image Gs calculated by the subtracter 2 and outputting the result as a conversion coefficient Gst of the differential image Gs, numeral 3 designates a quantizing unit for quantizing the conversion coefficient Gst outputted from the transforming unit 2 and outputting a quantized coefficient Gq and numeral 4 designates a coding unit for coding the quantized coefficient Gq outputted from the quantizing unit 3 and outputting a coded image Gc.

Further, numeral 5 designates a reverse quantizing unit for reverse-quantizing the quantized coefficient Gq outputted from the quantizing unit 3 and outputting a conversion coefficient Gqt, numeral 6 designates a reverse transforming unit for converting by the reverse discrete cosine transformation the conversion coefficient Gqt outputted from the reverse quantizing unit 5 and outputting an error image Gg, numeral 7 designates an adder for adding the predicted image Ge to the error image Gg outputted from the reverse transforming unit 6 and outputting a local decoded image Gk and numeral 8 designates a predicting unit for executing the motion compensation of the inputted image Gi in reference to the local decoded image Gk outputted from the adder 7 and determining the predicted image Ge.

Next, an explanation will be given of the operation of the conventional image coder illustrated in FIG. 1.

First, when the inputted image Gi to be coded is inputted to the subtracter 1, the subtracter 1 calculates the differential image Gs by subtracting the predicted image Ge outputted by the predicting unit 8 from the inputted image Gi and outputs the differential image Gs.

Differential image Gs=Inputted image Gi−Predicted image Ge

Next, when the differential image Gs is outputted from the subtracter 1, the transforming unit 2 converts, by discrete cosine transformation the differential image Gs to compress the amount of information of the differential image Gs and outputs the result as the conversion coefficient Gst of the differential image Gs.

Next, when the conversion coefficient Gst is outputted from the transforming unit 2, the quantizing unit 3 quantizes the conversion coefficient Gst and outputs the quantized coefficient Gq.

When the quantized coefficient Gq is outputted from the quantizing unit 3 in this way, the coding unit 4 generates the coded image Gc by coding the quantized coefficient Gq and outputs the coded image Gc to an image decoder (not illustrated). Further, in preparation for coding the next image at the next time, the reverse quantizing unit 5 calculates the conversion coefficient Gqt by reverse-quantizing the quantized coefficient Gq and thereafter, the reverse transforming unit 6 generates the error image Gg by converting, by reverse discrete cosine transformation, the converted coefficient Gqt.

Next, when the error image Gg is outputted from the reverse transforming unit 6, the adder 7 adds the predicted image Ge to the error image Gg and outputs the local decoded image Gk.

Next, when the local decoded image Gk is outputted from the adder 7, the predicting unit 8 determines the predicted image Ge by executing motion compensation for each frame of the inputted image Gi with reference to the local decoded image Gk and outputs the predicted image Ge to the subtracter 1.

The conventional image coder is constituted and operated as described above and therefore, even if a plurality of objects are present in one frame of the inputted image Gi, when the motions of the respective objects are the same, the error or the difference between the inputted image Gi and the predicted image Ge can be made comparatively small. However, the motion compensation of the inputted image Gi is executed in units of frames and therefore, when the motions of the respective objects are different from each other, the error or the difference between the inputted image Gi and the predicted image Ge is enlarged.

Further, in the case where a background image is hidden at the back of an object in respect of the local decoded image Gk and the background image emerges at the back of the object with respect of the inputted image Gi that is inputted currently, the error or the difference between the inputted image Gi and the predicted image Ge is enlarged since the background image is not present in the local decoded image Gk that is the reference image.

SUMMARY OF THE INVENTION

The present invention has been carried out to resolve the problem of the above-described conventional image coder and it is an object of the present invention to provide an image coder capable of reducing the error of a predicted image with respect of an inputted image and providing with high quality coded image even if the compression ratio is high.

Further, it is an object of the present invention to provide an image decoder capable of providing with high quality decoded images while the compression ratio is kept high.

According to one aspect of the present invention there is provided an image coder as a preferred embodiment of the present invention which comprises second storing means for storing a local decoded image generated by local decoded image generating means a predetermined period of time earlier than the local decoded image stored in first storing means, is provided and the motion compensation of an inputted image is executed with reference to the local decoded image stored by the first and the second storing means.

An image coder in another preferred embodiment of the present invention, is provided with a first predicting unit for executing the motion compensation for each block constituting a frame of the inputted image with reference to the local decoded image stored by the first and the second storing means and a second predicting means for executing the motion compensation for each segment area in a block constituting the frame of the inputted image with reference to the local decoded image stored by the first and the second storing means.

According to an image coder in another preferred embodiment of the present invention, an image dividing unit for analyzing the inputted image and dividing the inputted image into a plurality of segment areas, is provided in the second predicting unit.

An image coder in another preferred embodiment of the present invention, calculates degrees of approximation between a plurality of area shape patterns and the plurality of segment areas of the inputted image divided by the image dividing unit, extracts one of the area shape patterns having the highest degree of approximation and executes motion compensation for each of the segment areas constituting the area shape pattern having the highest degree of approximation.

An image coder in another preferred embodiment of the present invention, stores the differential image and the motion vector both coded by coding means and controls a quantized value of the local decoded image generating means in accordance with an amount of data.

An image coder in another preferred embodiment of the present invention, controls delay of storing time of the second storing means in respect of the first storing means with accordance with the amount of the storage of the differential image and the motion vector which are stored by quantization controlling means.

An image coder in another preferred embodiment of the present invention, detects a scene change based on the differential image produced by subtracting the predicted image from the inputted image and stores the local decoded image generated by the local decoded image generating means in the second storing means when a predetermined number of frames are inputted after the scene change is detected.

An image decoder in another preferred embodiment of the present invention, is provided with second storing means for storing a decoded image generated by decoded image generating means a predetermined period of time earlier than the decoded image stored in first storing means in which a predicted image is generated based on the decoded image stored by the first or the second storing means and a motion vector decoded by decoded image generating means.

An image decoder in another preferred embodiment of the present invention, generates the predicted image, when an image coder executes motion compensation for each of the segment areas, by combining the decoded image for the respective segment areas stored by the first or the second storing means.

BRIEF DESCRIPTION OF THE DRAWINGS

FIG. 15 illustrates levels of the segment patterns;

DETAILED DESCRIPTION OF THE PREFERRED EMBODIMENTS

An explanation will be given of image coders and image decoders which are the preferred embodiments of the present invention in reference to the drawings as follows.

Embodiment 1.

Figure 1:
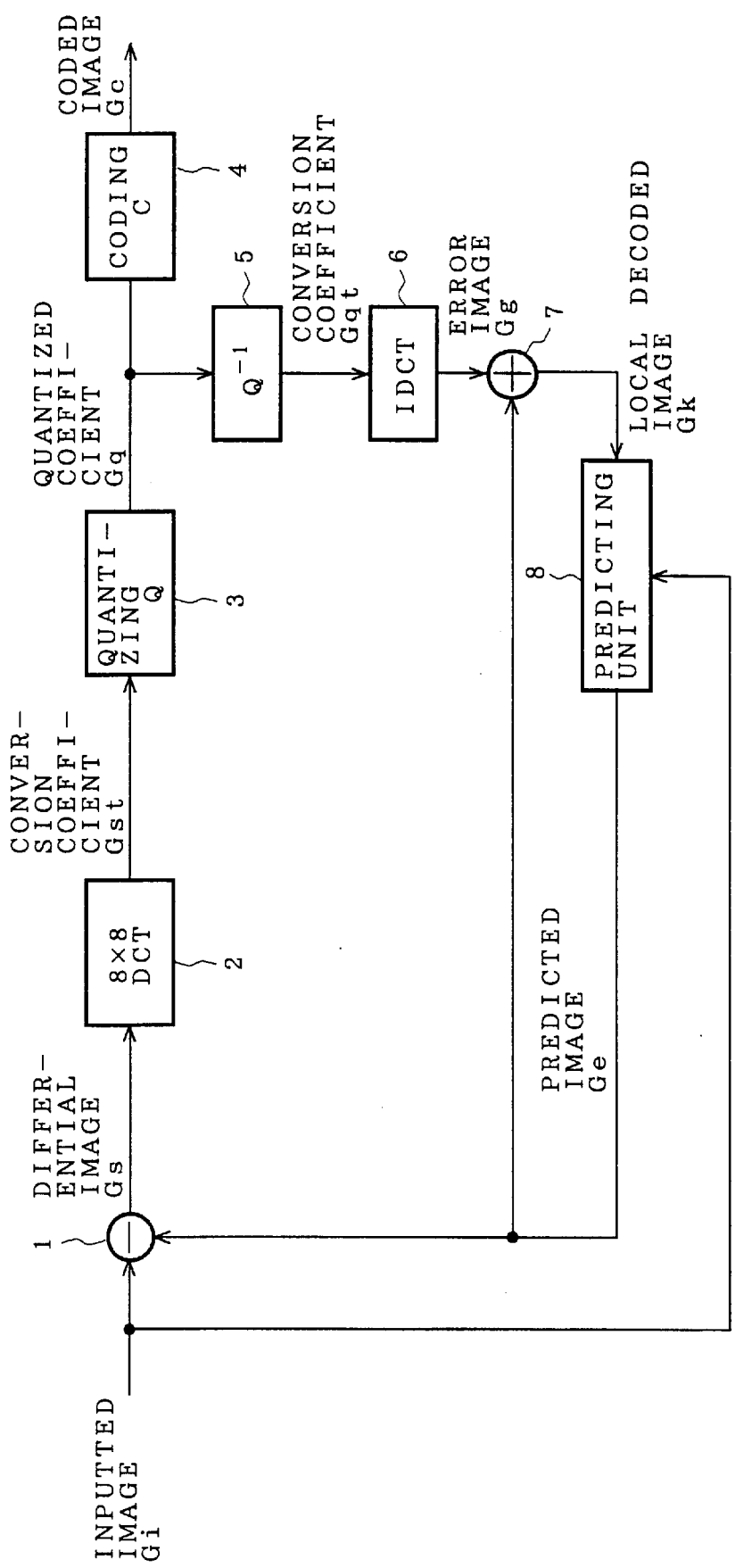
FIG. 1 is a block diagram showing a conventional image coder.
Figure 2:
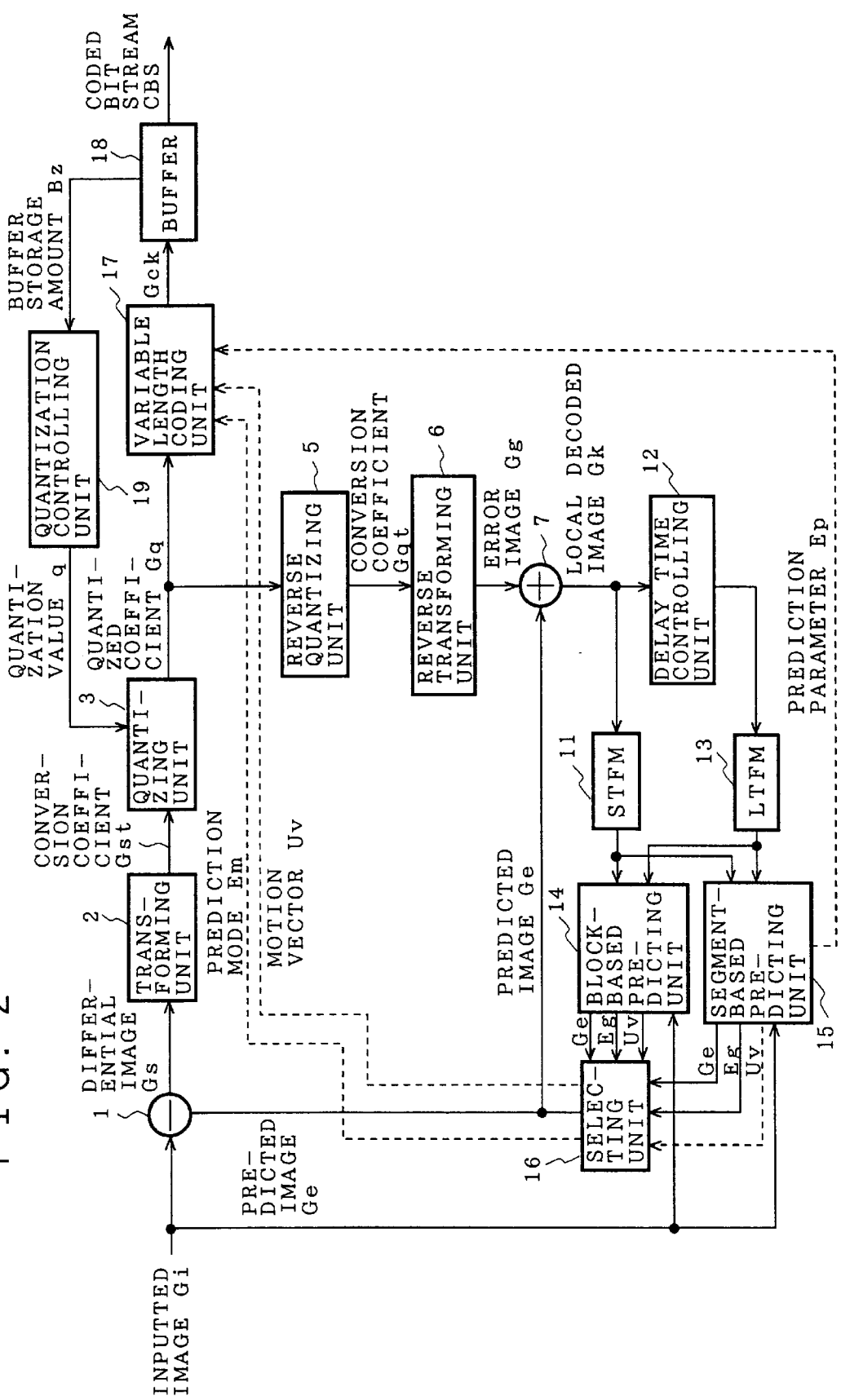
FIG. 2 is a block diagram showing an image coder in accordance with the first Embodiment of the present invention.

FIG. 2 is a block diagram showing an image coder in accordance with the first Embodiment of the present invention. In FIG. 2, numeral 1 designates a subtracter for calculating the differential image Gs by subtracting the predicted image Ge from the inputted image Gi, numeral 2 designates a transforming unit for converting by the discrete cosine transformation the differential image Gs calculated by the subtracter 2 and outputting the result of conversion as the conversion coefficient Gst of the differential image Gs, numeral 3 designates a quantizing unit for quantizing the conversion coefficient Gst outputted from the transforming unit 2 and outputting the quantized coefficient Gq, numeral 5 designates a reverse quantizing unit for reverse-quantizing the quantized coefficient Gq outputted from the quantizing unit 3 and outputting the conversion coefficient Gqt, numeral 6 designates a reverse transforming unit for converting by the reverse discrete cosine transformation the conversion coefficient Gqt outputted from the reverse quantizing unit 5 and outputting the error image Gg and numeral 7 designates an adder for adding the predicted image Ge to the error image Gg outputted from the reverse transforming unit 6 and outputting a local decoded image Gk.

Numeral 11 designates STFM for storing the local decoded image Gk outputted from the adder 7. STFM is the abbreviation of "Short Term Frame Memory". Numeral 12 designates a delay time controlling unit for outputting the local decoded image Gk to LTFM 13 after the elapse of a predetermined period of time since the local decoded image Gk has been outputted from the adder 7 and numeral 13 designates LTFM for storing the local decoded image Gk outputted from the adder 7 a predetermined period of time earlier than the local decoded image Gk stored by STFM 11. LTFM is the abbreviation of "Long Term Frame Memory".

Numeral 14 designates a block-based predicting unit as a first predicting unit for executing the motion compensation for each frame of the inputted image Gi in reference to the local decoded image Gk stored by STFM 11 and LTFM 13 and generating the predicted image Ge, a motion vector Uv and a prediction error Eg, numeral 15 designates a segment-based predicting unit as a second predicting unit for executing the motion compensation for each segment area constituting the frame of the inputted image Gi in reference to the local decoded image Gk stored by STFM 11 and LTFM 13 and generating the predicted image Ge, the motion vector Uv and the prediction error Gg and numeral 16 designates a selecting unit calculating a deviation between the prediction error Eg generated by the block-based predicting unit 14 and the prediction error Eg generated by the segment-based predicting unit 15 and selecting the predicted image Ge and the motion vector Uv generated by the block-based predicting unit 14 or the segment-based predicting unit 15 in accordance with the deviation.

Numeral 17 designates a variable length coding unit for generating a variable length code Gck by coding in variable length the quantized coefficient Gq outputted from the quantizing unit 3, the motion vector Uv and a prediction mode Em outputted from the selecting unit 16 and a prediction parameter Ep outputted from the segment-based predicting unit 15 respectively, numeral 18 designates a buffer for storing the variable length code Gck generated by the variable length coding unit 17 and outputting the variable length code Gck to an image decoder as a coded bit stream CBS when the amount of storage reaches a threshold value and numeral 19 designates a quantization controlling unit for controlling a quantization value q of the quantizing unit 3 in accordance with a buffer storage amount Bz (amount of storage of variable length code Gck) of the buffer 18.

Figure 3:
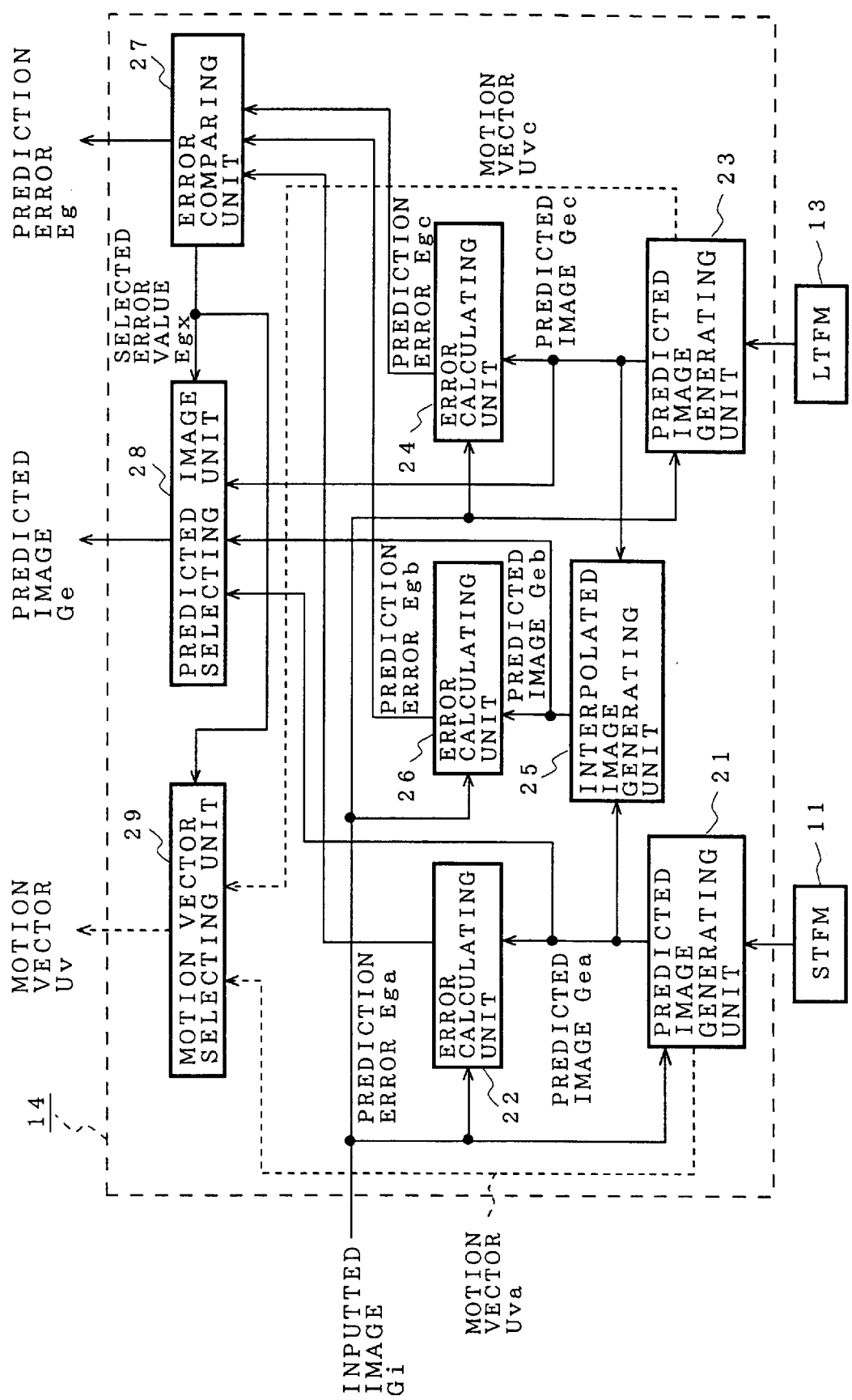
FIG. 3 is a block diagram showing a block-based predicting unit 14 in the image coder illustrated in FIG. 2.

FIG. 3 is a detailed block diagram showing the block-based predicting unit 14 in the image coder illustrated in FIG. 2. In FIG. 3, numeral 21 designates a predicted image generating unit for generating a predicted image Gea minimizing a prediction error Ega by executing the motion compensation for each frame of the inputted image Gi in reference to the local decoded image Gk stored in STFM 11 and outputting the predicted image Gea and a motion vector Uva and numeral 22 designates an error calculating unit for subtracting the predicted image Gea from the inputted image Gi and outputting the absolute value of the result of the subtraction as the prediction error Ega. Numeral 23 designates a predicted image generating unit for generating a predicted image Gec minimizing the absolute value of a prediction error Egc by executing the motion compensation for each frame of the inputted image Gi in reference to the local decoded image Gk stored in LTFM 13, numeral 24 designates an error calculating unit for subtracting the predicted image Gec from the inputted image Gi and outputting the absolute value of the result of subtraction as the prediction error Egc and numeral 25 designates an interpolated image generating unit for generating an averaged image (interpolated image) of the predicted image Gea generated by the predicted image generating unit 21 and the predicted image Gec generated by the predicted image generating unit 23 and outputting the interpolated image as a predicted image Geb. Numeral 26 designates an error calculating unit for subtracting the predicted image Geb from the inputted image Gi and outputting the absolute value of the result of subtraction as a prediction error Egb.

Numeral 27 designates an error comparing unit for selecting a minimum prediction error among the prediction errors Ega, Egb and Egc outputted from the error calculating units 22, 26 and 24, outputting the minimum prediction error as the prediction error Eg and outputting a selected error value Egx. Numeral 28 designates a predicted image selecting unit for selecting a predicted image minimizing the prediction error among the predicted images Gea, Geb and Gec based on the selected error value Egx outputted by the error comparing unit 27 and numeral 29 designates a motion vector selecting unit for selecting and outputting the motion vector Uva when the predicted image Gea is selected by the predicted image selecting unit 28 and selecting and outputting the motion vector Uvc when the predicted image Gec is selected and outputting the motion vector Uva and the motion vector Uvc when the predicted image Geb is selected.

Figure 4:
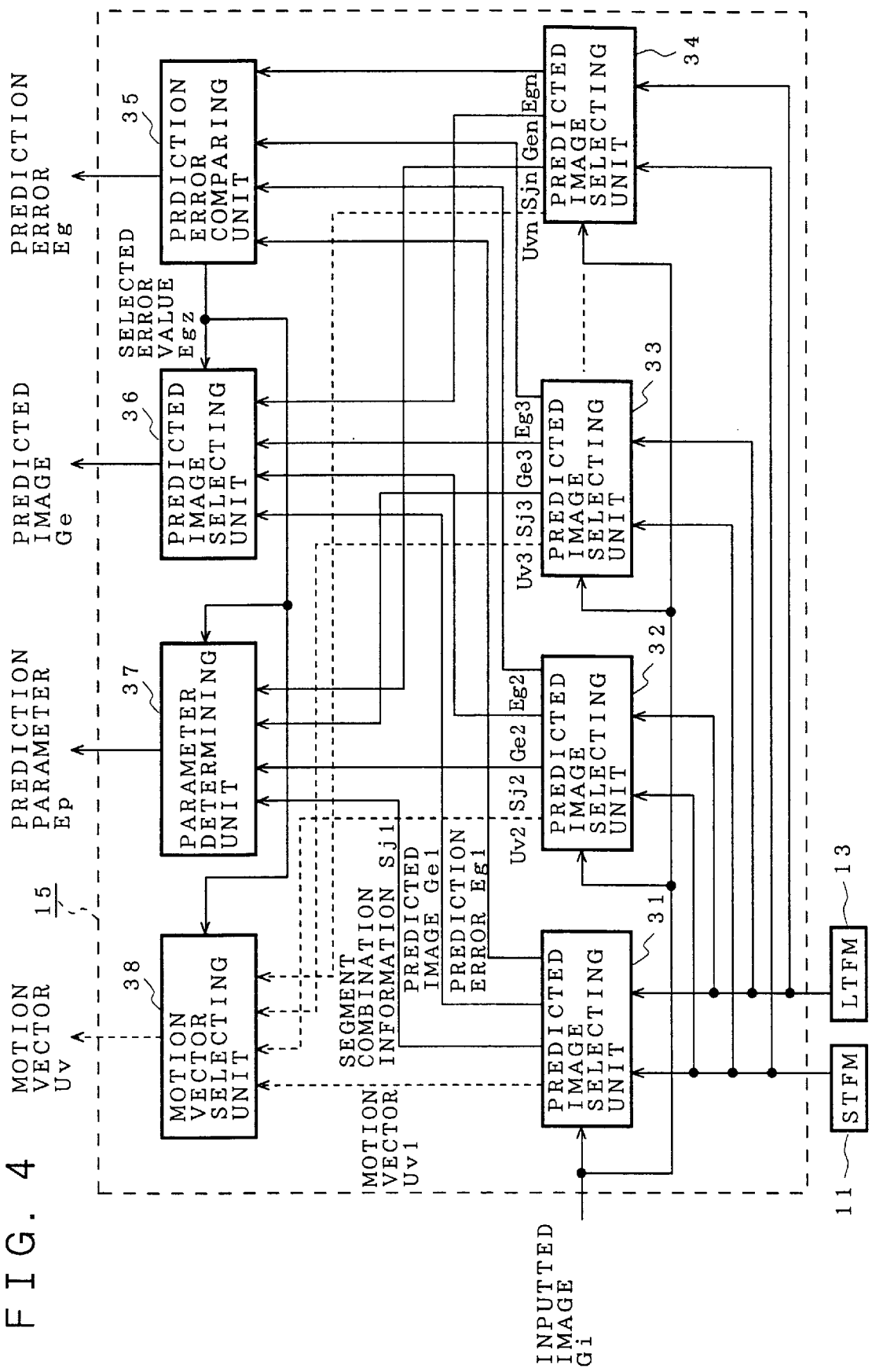
FIG. 4 is a block diagram showing a segment-based predicting unit 15 in the image coder illustrated in FIG. 2.

FIG. 4 is a detailed block diagram showing the segment-based predicting unit 15 in the image coder illustrated by FIG. 2. In FIG. 4, numerals 31 through 34 designate predicted image selecting units (refer to the details in explaining FIG. 5, mentioned later) for generating predicted images Ge 1 through Ge n minimizing respective prediction errors Eg 1 through Eg n by executing the motion compensation for each segment area constituting the frame of the inputted image Gi in reference to the local decoded image Gk stored in STFM 11 and LTFM 13 and outputting predicted images Ge1 through Gen, motion vectors Uv1 through Uvn and segment combination information Sj1 through Sjn, numeral 35 designates a prediction error comparing unit for selecting a minimum prediction error among the prediction errors Eg1 through Egn outputted from the predicted image selecting units 31 through 34, outputting the minimum prediction error as the prediction error Eg and outputting a selected error value Egz, numeral 36 designates a predicted image selecting unit for selecting a predicted image minimizing the prediction error among the predicted images Ge1 through Gen based on the selected error value Egz, numeral 37 designates a parameter determining unit for inputting the segment combination information Sj1 through Sjn and the selected error value Egz and determining the prediction parameter Ep and numeral 38 designates a motion vector selecting unit for selecting a motion vector in respect of the predicted image minimizing the prediction error among the motion vectors Uv1 through Uvn based on the selected error value Egz.

Figure 5:
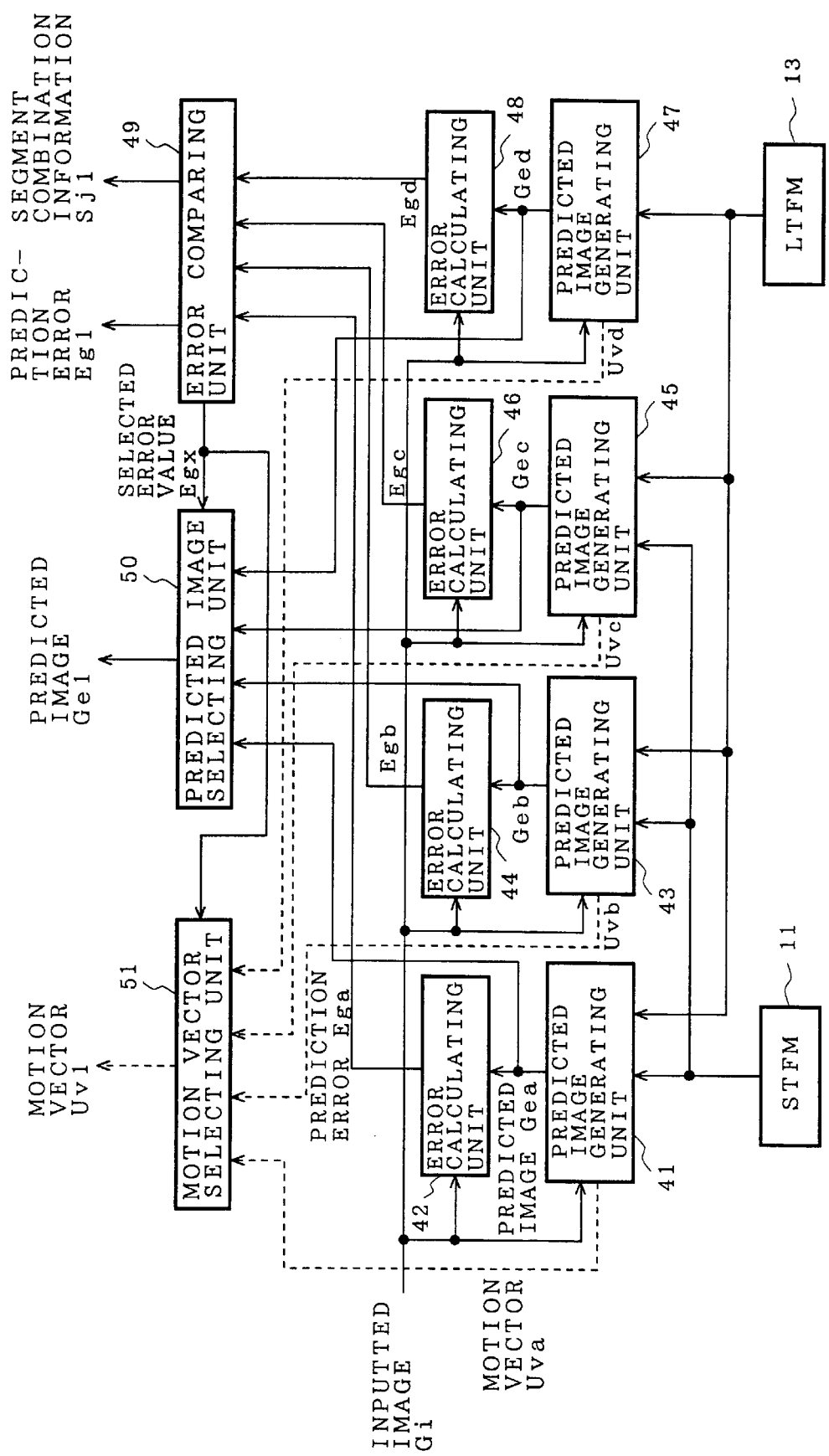
FIG. 5 is a block diagram showing predicted image selecting units 31 through 34 in the segment-based predicting unit 15 illustrated in FIG. 4.

FIG. 5 is a detailed block diagram showing one of the predicted image selecting units 31 through 34 in the segment-based predicting unit 15. In FIG. 5, numeral 41 designates a predicted image generating unit for generating a predicted image Gea minimizing a prediction error Ega and outputting the predicted image Gea and a motion vector Uva by executing the motion compensation at a predetermined segment area in a predetermined segment pattern in reference to the local decoded image Gk stored in STFM 11 and LTFM 13, numeral 42 designates an error calculating unit for subtracting the predicted image Gea from the inputted image Gi and outputting the absolute value of the result of subtraction as the prediction error Ega, numeral 43 designates a predicted image generating unit for generating a predicted image Geb minimizing a prediction error Egb and outputting the predicted image Geb and a motion vector Uvb by executing the motion compensation at a predetermined segment area in a predetermined segment pattern in reference to the local decoded image Gk stored in STFM 11 and LTFM 13 and numeral 44 designates an error calculating unit for subtracting the predicted image Geb from the inputted image Gi and outputting the absolute value of the result of subtraction as the prediction error Egb.

Numeral 45 designates a predicted image generating unit for generating a predicted image Gec minimizing a prediction error Egc and outputting the predicted image Gec and a motion vector Uvc by executing the motion compensation at a predetermined segment area in a predetermined segment pattern in reference to the local decoded image Gk stored in STFM 11 and LTFM 13, numeral 46 designates an error calculating unit for subtracting the predicted image Gec from the inputted image Gi and outputting the absolute value of the result of subtraction as the prediction error Egc, numeral 47 designates a predicted image generating unit for generating a predicted image Ged minimizing a prediction error Egd and outputting the predicted image Ged and a motion vector Uvd by executing the motion compensation at a predetermined segment area in a predetermined segment pattern in reference to the local decoded image Gk stored in STFM 11 and LTFM 13 and numeral 48 designates an error calculating unit for subtracting the predicted image Ged from the inputted image Gi and outputting the absolute value of the result of subtraction as the prediction error Egd.

Numeral 49 designates an error comparing unit for selecting a minimum prediction error among the prediction errors Ega through Egd outputted from the error calculating units 42, 44, 46 and 48 and outputting a selected error value Egx, numeral 50 designates a predicted image selecting unit for selecting a predicted image minimizing the absolute value of the prediction error among the predicted images Gea through Ged based on the selected error value Egx and numeral 51 designates a motion vector selecting unit for selecting a motion vector in respect of a predicted image minimizing the absolute value of the prediction error among the motion vectors Uva through Uvd based on the selected error value Egx.

Figure 6:
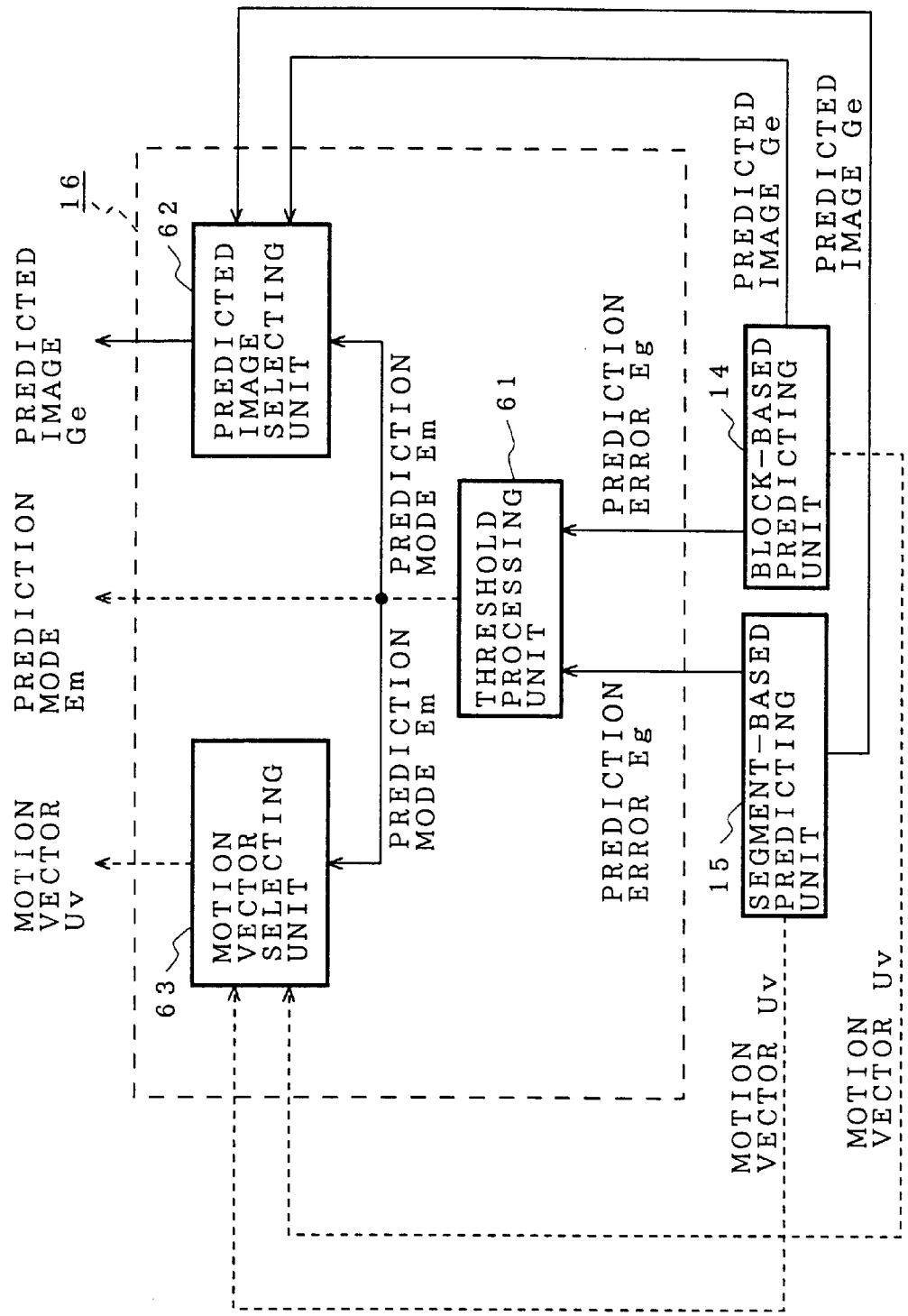
FIG. 6 is a block diagram showing a selecting unit 16 in the image coder illustrated in FIG. 2.

FIG. 6 is a block diagram showing the selecting unit 16 in the image coder illustrated in FIG. 2. In FIG. 6, numeral 61 designates a threshold processing unit for comparing a result of subtracting a threshold value from the prediction error Eg outputted from the block-based predicting unit 14 with the prediction error Eg outputted from the segment-based predicting unit 15 and outputting the result of comparison as the prediction mode Em, numeral 62 designates a predicted image selecting unit for selecting either one of the predicted image Ge outputted by the block-based predicting unit 14 and the predicted image Ge outputted by the segment-based predicting unit 15 based on the prediction mode Em outputted by the threshold processing unit 61 and numeral 63 designates a motion vector selecting unit for selecting either one of the motion vector Uv outputted by the block-based predicting unit 14 and the motion vector Uv outputted by the segment-based predicting unit 15 based on the prediction mode Em outputted by the threshold processing unit 61.

Next, an explanation will be given of the operation of the image coder in accordance with the first Embodiment.

First, when the inputted image Gi to be coded is inputted to the subtracter 1, the differential image Gs is calculated by subtracting the predicted image Ge (mentioned later) outputted by the selecting unit 16 from the inputted image Gi and the differential image Gs is outputted by using the following Equation (1).

Differential image $Gs$=Inputted image $Gi$−Predicted image $Ge$   (1)

When the differential image Gs is outputted from the subtracter 1, the transforming unit 2 converts, by discrete cosine transformation the differential image Gs to compress the amount of the information of the differential image Gs and outputs the result as the conversion coefficient Gst of the differential image Gs.

Next, when the conversion coefficient Gst is outputted from the transforming unit 2, the quantizing unit 3 quantizes the conversion coefficient Gst and outputs the quantized coefficient Gq.

When the quantized coefficient Gq is outputted from the quantizing unit 3 in this way, the variable length coding unit 17 codes in variable length the quantized coefficient Gq etc., the reverse quantizing unit 5 calculates the conversion coefficient Gqt by reverse-quantizing the quantized coefficient Gq in preparation for coding the next and thereafter, the reverse transforming unit 6 generates the error image Gg by converting, by reverse discrete cosine transformation, the conversion coefficient Gqt.

Next, when the error image Gg is outputted from the reverse transforming unit 6, the adder 7 generates the local decoded image Gk by adding the predicted image Ge to the error image Gg and outputs the local decoded image Gk.

The local decoded image Gk outputted from the adder 7 is immediately stored in STFM 11. However, the local decoded image Gk is not immediately stored in LTFM 13 but stored there after the elapse of a predetermined period of time.

For example, a background image is hidden at the back of an object with respect to a local decoded image Gk stored in STFM 11. On the other hand, a reference image (reference image highly correlated with the image to be coded) in which the background image is present may be provided within a local decoded image stored in the LTFM 13. Accordingly, the local decoded image Gk is not stored immediately in LTFM 13 but is stored after the elapse of a predetermined period of time. Incidentally, a storing area for holding the local decoded image Gk may not be provided to the delay time controlling unit 12. That is, the delay time controlling unit 12 may be a switch that is turned off until a time at which the local decoded image Gk is stored in LTFM 13.

When the local decoded image Gk that is the reference image is stored to STFM 11 and LTFM 13 in this way, the block-based predicting unit 14 and the segment-based predicting unit 15 determine the predicted image Ge and the like with reference to the local decoded image Gk.

Next, an explanation will be given of the operation of the block-based predicting unit 14 with reference to FIG. 3.

First, when the local decoded image Gk is stored in STFM 11, the predicted image generating unit 21 generates the predicted image Gea minimizing the prediction error Ega by executing motion compensation for each frame of the inputted image Gi with reference to the local decoded image Gk and the error calculating unit 22 calculates the prediction error Ega by subtracting the predicted image Gea from the inputted image Gi. Further, the motion vector Uva in executing the motion compensation is outputted to the motion vector selecting unit 29 by the predicted image generating unit 21.

Meanwhile, when the local decoded image Gk is stored to LTFM 13, the predicted image generating unit 23 generates the predicted image Gec minimizing the prediction error Egc by executing motion compensation for each frame of the inputted image Gi with reference to the local decoded image Gk and the error calculating unit 24 calculates the prediction error Egc by subtracting the predicted image Gec from the inputted image Gi. Further, the motion vector Uvc in executing the motion compensation is outputted to the motion vector selecting unit 29 by the predicted image generating unit 23.

Next, when the predicted image Gea is outputted from the predicted image generating unit 21 and the predicted image Gec is outputted from the predicted image generating unit 23, the interpolated image generating unit 25 generates an averaged image (interpolated image) of the predicted image Gea and the predicted image Gec and outputs the interpolated image as the predicted image Geb.

Figure 7:
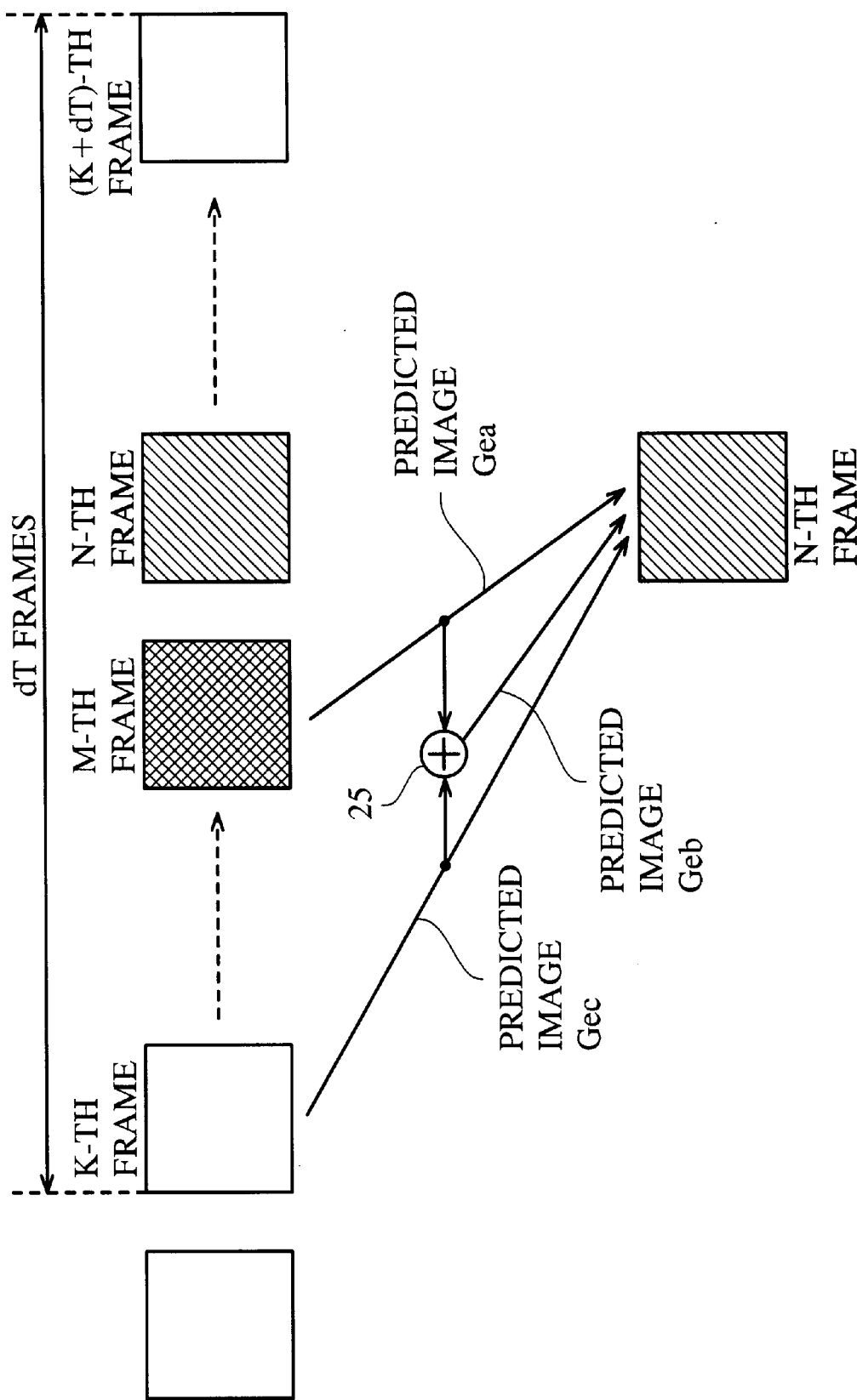
FIG. 7 illustrates the operation of the block-based predicting unit 14 where the coding sequence of the inputted image Gi is segmented at every dT frame.

Further, when the coding sequence of the inputted image Gi is segmented by respective dT frames as illustrated in FIG. 7, if the currently inputted image Gi is at a N-th frame, the three predicted images Gea, Geb and Gec shown below become the reference images.

That is, the predicted image Gea generated based on the local decoded image Gk (local decoded image Gk stored to STFM 11) with respect to the inputted image Gi at a M-th frame, the predicted image Gec generated based on the local decoded image Gk (local decoded image Gk stored to LTFM 13) with respect to the inputted image Gi at a K-th frame and the predicted image Geb generated by the interpolated image generating unit 25 becomes the reference images.

The time-sequential change in FIG. 7 progresses from left to right in the drawing.

When the three reference images are generated in this way, the error comparing unit 27 selects the minimum prediction error among the prediction errors Ega, Egb and Egc outputted from the error calculating units 22, 26 and 24 and outputs the selected error value Egx. For example, when the prediction error Ega is smallest, the prediction error Ega is outputted as the prediction error Eg and the selected error value Egx indicating that the prediction error Ega is selected is outputted.

Next, when the selected error value Egx is outputted from the error comparing unit 27, the predicted image selecting unit 28 selects the predicted image with respect to the least prediction error based on the selected error value Egx. For example, when the selected error value Egx indicates that the prediction error Ega is selected, the predicted image Gea is outputted as the predicted image Ge.

Further, when the selected error value Egx is outputted from the error comparing unit 27, the motion vector selecting unit 29 selects the motion vector with respect to the smallest prediction error based on the selected error value Egx.

Specifically, when the predicted image Gea is selected by the predicted image selecting unit 28, the motion vector Uva is outputted as the motion vector Uv, when the predicted image Gec is selected, the motion vector Uvc is outputted as the motion vector Uv and when the predicted image Geb is selected, both of the motion vector Uva and the motion vector Uvc are outputted as the motion vector Uv.

Next, an explanation will be given of the operation of the segment-based predicting unit 15 in reference to FIG. 4 and FIG. 5.

First, when the local decoded image is stored in STFM 11 and LTFM 13, the predicted image generating units 41, 43, 45 and 47 in the predicted image selecting units 31 through 34 generate the predicted images Gea through Ged as reference images MB (1) through MB (4) by executing motion compensation at a predetermined segment area in a predetermined segment pattern in reference to the local decoded image Gk stored in STFM 11 and LTFM 13.

Figure 8:
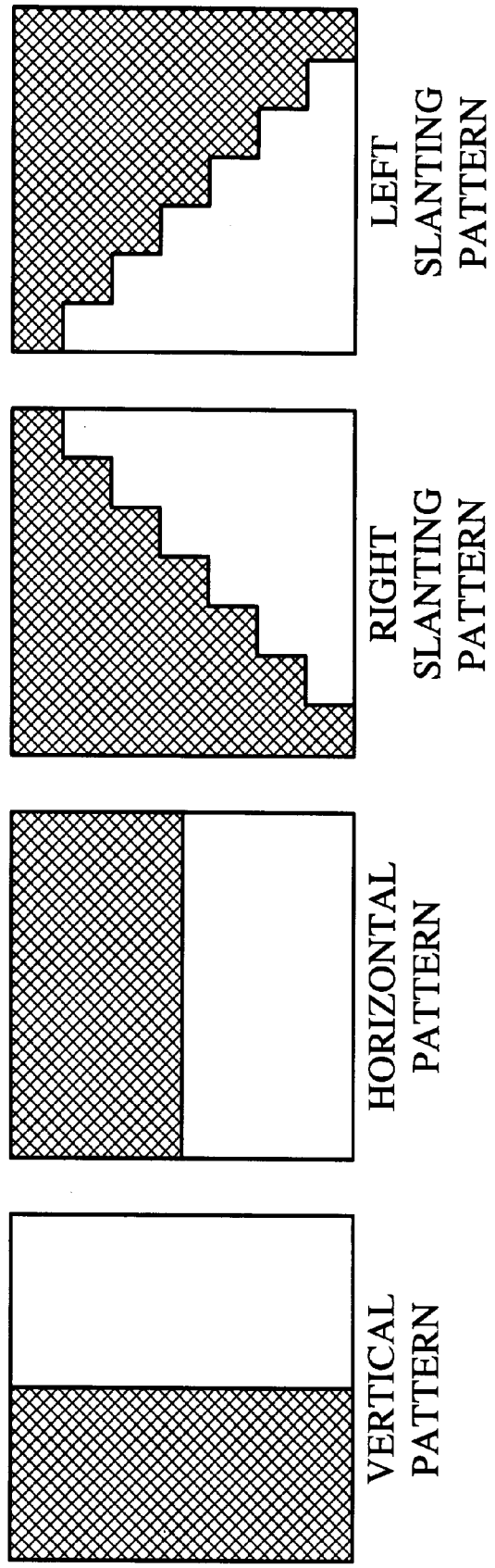
FIG. 8 illustrates segment patterns used in the image coder of FIG. 2.

Further, according to the image coder of the first Embodiment, four segment patterns are set as illustrated in FIG. 8. A vertical pattern as illustrated in FIG. 8 is set to the predicted image generating units 41, 43, 45 and 47 in the predicted image selecting units 31, a horizontal pattern as illustrated in FIG. 8 is set to the predicted image generating units 41, 43, 45 and 47 in the predicted image selecting unit 32, a right-slanting pattern as illustrated in FIG. 8 is set to the predicted image generating units 41, 43, 45 and 47 in the predicted image selecting unit 33 and a left-slanting pattern as illustrated in FIG. 8 is set to the predicted image generating units 41, 43, 45 and 47 in the predicted image selecting unit 34.

An explanation will be given here of generating the prediction errors Ega through Egd as factors of the reference images MB (1) through MB (4). As described above the vertical pattern as illustrated in FIG. 8 is set to the predicted image generating units 41, 43, 45 and 47 in the predicted image selecting unit 31 and therefore, the segment area is divided in two of a left half segment area (black portion) and a right half segment area (white portion).

Figure 9:
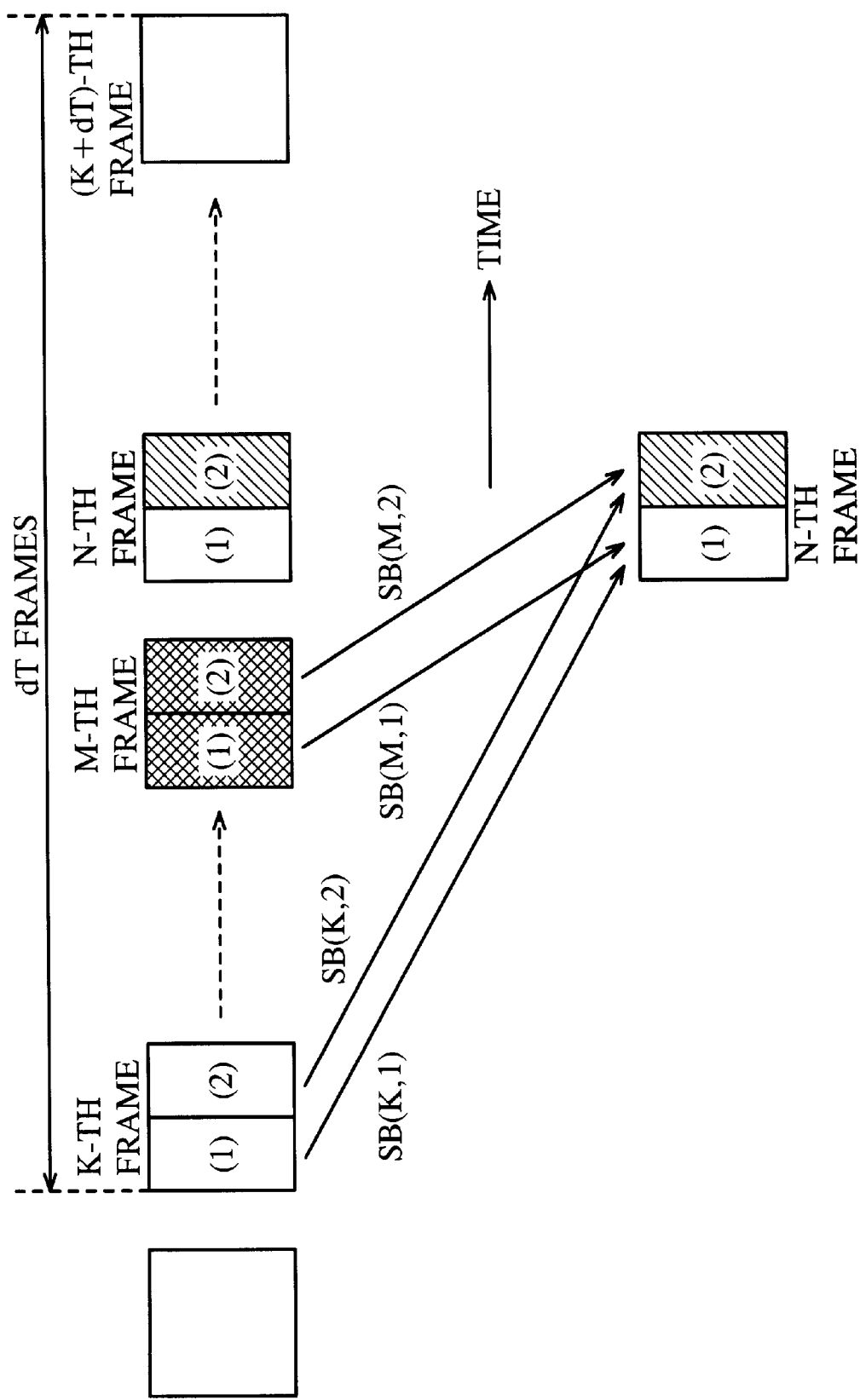
FIG. 9 illustrates explaining the operation of the segment-based predicting unit 15.

Therefore, as illustrated in FIG. 9, for example, the predicted image generating unit 41 generates the predicted image Gea as the reference image MB (1) by executing the motion compensation for each of the left half and right half segment areas of a N-th frame in reference to the local decoded image Gk. In a similar way the predicted image generating units 43, 45 and 47 respectively generate the predicted images Geb, Gec and Ged as the reference image MB (2), the reference image MB (3) and the reference image MB (4), which are shown by the following Equations (2) through (5).

$$MB(1)=SB(K, 1)+SB(K, 2) \qquad (2)$$

$$MB(2)=SB(K, 1)+SB(M, 2) \qquad (3)$$

$$MB(3)=SB(M, 1)+SB(K, 2) \qquad (4)$$

$$MB(4)=SB(M, 1)+SB(M, 2) \qquad (5)$$

where SB ( ) designates a predicted image minimizing the prediction error in the segment area and where (K, 1) is a left half segment area of a K-th frame, (K, 2) is a right half segment area of the K-th frame, (M, 1) is a left half segment area of a M-th frame and (M, 2) is a right half segment area of the M-th frame.

The time-sequential change in FIG. 9 progresses from left to right in the drawing.

When the predicted images Ega through Egd are generated in this way, the error comparing unit 49 selects a minimum prediction error among the prediction errors Ega through Egd (errors of the predicted images Gea through Ged with respect to the inputted image Gi) respectively outputted from the error calculating units 42, 44, 46 and 48. For example, when the prediction error Ega is smallest, the prediction error Ega is outputted as a prediction error Eg1 and outputs the selected error value Egx indicating that the prediction error Ega is selected. Further, a segment combination information Sj1 (content of the predicted image Ega, that is, content of Equation (2)) is outputted thereby.

Next, when the selected error value Egx is outputted from the error comparing unit 49, the predicted image selecting unit 50 selects a predicted image with respect to the smallest prediction error based on the selected error value Egx. For example, when the selected error value Egx indicates that the prediction error Ega is selected, the predicted image Gea is outputted as a predicted image Ge 1.

Next, when the selected error value Egx is outputted from the error comparing unit 49, the motion vector selecting unit 51 selects the motion vector with respect to the smallest prediction error based on the selected error value Egx. For example, when the selected error value Egx indicates that the prediction error Ega is selected, the predicted image generating unit 41 outputs the generated motion vector Uva as a motion vector Uv 1.

When the predicted images and the like are outputted respectively from N of the predicted image selecting units 31 through 34 in this way (as described above the four segment patterns are set in FIG. 8 and therefore, N=4 in the image coder of the first Embodiment), the prediction error comparing unit 35 selects the smallest prediction error among the prediction errors Eg1 through Egn outputted from the predicted image selecting units 31 through 34. For example, when the prediction error Eg1 is smallest, the prediction error Eg1 is outputted as the prediction error Eg and outputs the selected error value Egz indicating that the prediction error Eg 1 is selected.

Next, when the selected error value Egz is outputted from the prediction error comparing unit 35, the predicted image selecting unit 36 selects a predicted image with respect to the smallest prediction error based on the selected error value Egz. For example, when the selected error value Egz indicates that the prediction error Eg1 is selected, the predicted image Ge1 is outputted as the predicted image Ge.

Further, when the selected error value Egz is outputted from the prediction error comparing unit 35, the parameter determining unit 37 determines the prediction parameter Ep based on the selected error value Egz and the segment combination information Sj1 through Sjn.

Figure 10:
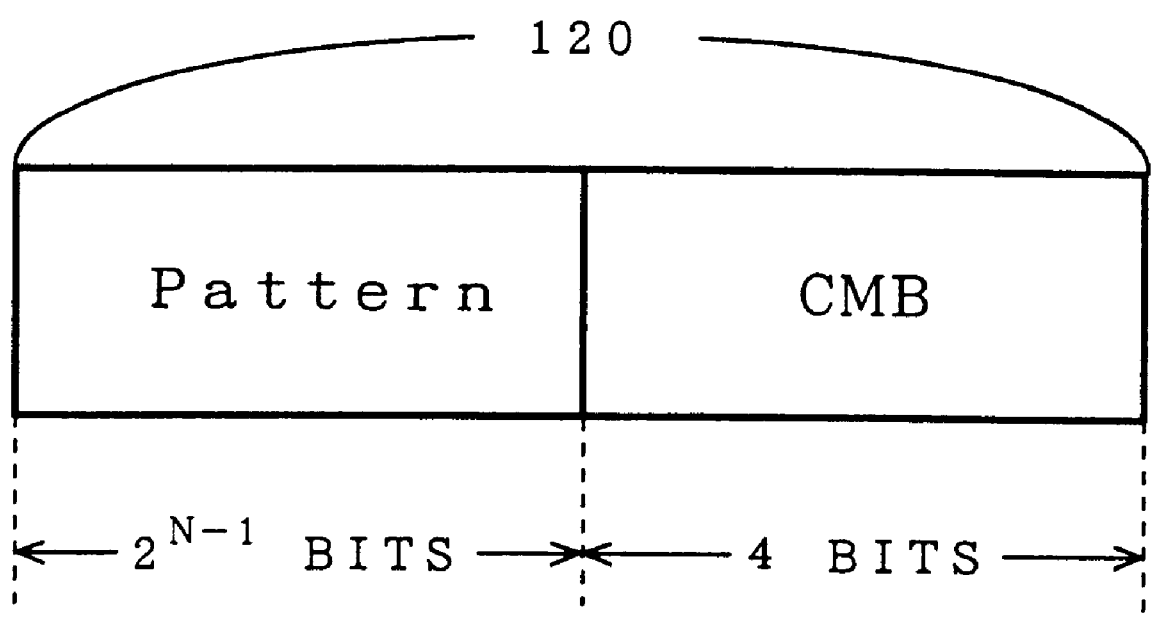
FIG. 10 illustrates a prediction parameter Ep.

FIG. 10 is a block diagram showing the prediction parameter Ep in which "Pattern" designates a number of an actually selected segment pattern among N of segment patterns (as described above the four segment patterns are shown in FIG. 8.) and if there are N segment patterns, a bit length of $2^{N-1}$ bits is necessary in accordance with fixed length coding.

Further, "CMB" indicates the number of a selected predicted image and a bit length of 2 bits is necessary.

Also, when the selected error value Egz is outputted from the prediction error comparing unit 35, the motion vector selecting unit 38 selects a motion vector with respect of the smallest prediction error based on the selected error value Egz. For example, when the selected error value Egz indicates that the prediction error Eg1 is selected, the motion vector Uv1 is selected as the motion vector Uv.

Further, when the predicted image Ge, the prediction error Eg and the motion vector Uv are outputted from each of the block-based predicting unit 14 and the segment-based predicting unit 15, first, the threshold processing unit 61 in the selecting unit 16 subtracts a threshold value from the prediction error Eg outputted from the block-based predicting unit 14 and compares the result of the subtraction with the prediction error Eg outputted from segment-based predicting unit 15 and outputs the one of the prediction mode having the smaller error as the prediction mode Em. Generally, an absolute error or a averaged square error is used to determine the error.

Further, when the prediction mode Em is outputted from the threshold processing unit 61, the predicted image selecting unit 62 selects either one of the predicted image Ge outputted by the block-based predicting unit 14 and the predicted image Ge outputted by the segment-based predicting unit 15.

When the prediction mode Em is outputted from the threshold processing unit 61, the motion vector selecting unit 63 selects either one of the motion vector Uv outputted by the block-based predicting unit 14 and the motion vector Uv outputted by the segment-based predicting unit 15 based on the prediction mode Em.

The predicted image Ge that is selected in this way is outputted to the subtracter 1 and the prediction mode Em and the motion vector Uv are outputted to the variable length coding unit 17.

Next, when the prediction mode Em and the motion vector Uv are outputted from the selecting unit 16, the variable length coding unit 17 generates the variable length code Gck by coding in variable length the quantized coefficient Gq outputted from the quantizing unit 3, the motion vector Uv, the prediction mode Em and the prediction parameter Ep respectively and the variable length code Gck is stored in the buffer 18.

Then, the buffer 18 outputs the variable length code Gck to an image decoder as the coded bit stream CBS when the amount of storage of the variable length code Gck reaches a threshold value.

When coding is performed at a constant bit rate, the quantization controlling unit 19 monitors the buffer storage amount Bz (amount of storage of the variable length code Gck) of the buffer 18 and controls the quantization value q in accordance with the buffer storage amount Bz in order to output the coded bit stream CBS to an image decoder.

Specifically, when the buffer storage amount Bz is decreased, the quantization value q of the quantizing unit 3 is set larger and when the buffer storage amount Bz is increased, the quantization value q of the quantizing unit 3 is set smaller to restrain the amount of information.

As is apparent from the above description, according to the image coder of the first Embodiment, LTFM 13 storing the local decoded image Gk that is outputted from the adder 7 a predetermined period of time earlier than the local decoded image Gk stored to STFM 1, is provided in addition to STFM 1 and the motion compensation of the inputted image is executed with reference to the local decoded images Gk stored by STFM 11 and LTFM 13. Therefore, even in the case where although a background image is hidden at the back of an object in one of the local decoded image Gk stored in STFM 11 and the background image emerges at the back of the object in a current input image Gi, the reference image having a time-sequential shift in respect of the local decoded image Gk stored in STFM 11, can be secured in LTFM 13 and therefore, the possibility whereby the reference image in which the background image is present at the back of the object is provided, is promoted by which an effect of promoting the coding accuracy of the image coder can be provided. Accordingly, it is extremely advantageous in transmission of a dynamic image at a low bit rate which requires a high prediction efficiency.

Further, the block-based predicting unit 14 executing the motion compensation for each frame of the inputted image Gi with reference to the local decoded image Gk and the segment-based predicting unit 15 executing the motion compensation for each segment area in a predetermined segment pattern, are provided and therefore, the error between the predicted image Ge and the inputted image Gi can be decreased even if a plurality of objects present in one block within a frame of the inputted image Gi have different motions.

Embodiment 2.

According to the above-described image coder of the first Embodiment, each segment pattern includes two segment areas in one macroblock as illustrated in FIG. 8. However, segment patterns including three or more segment areas may be used with an effect similar to that of the image coder of the first Embodiment.

For example, when overlapped regions of the vertical pattern and the horizontal pattern shown by FIG. 8 constitute segments in the image coder illustrated in FIG. 2, four segment areas are set in one macroblock. However, in this case, since the number of bits for coding of "Pattern" in the prediction parameter Ep becomes $2^{N-1}$ bits and 16 patterns are present for "CMB", a bit length of 4 bits is necessary. The other operation is the same as that in the image coder of the first Embodiment and therefore, explanation will be omitted.

Embodiment 3.

Although explanation has been given of the case where the delay time controlling unit 12 successively stores the delayed local decoded image Gk to LTFM 13 according to the image coders of the first and second Embodiments, the local decoded image Gk may be stored only at predetermined timings.

Incidentally, although in this case the same local decoded image Gk is stored to LTFM 13 until the next timing, the local decoded image Gk may be the local decoded image Gk delayed by the delay time controlling unit 12 or may be the local decoded image Gk that is outputted from the adder 7 at timings of storing operation.

Embodiment 4.

Figure 11:
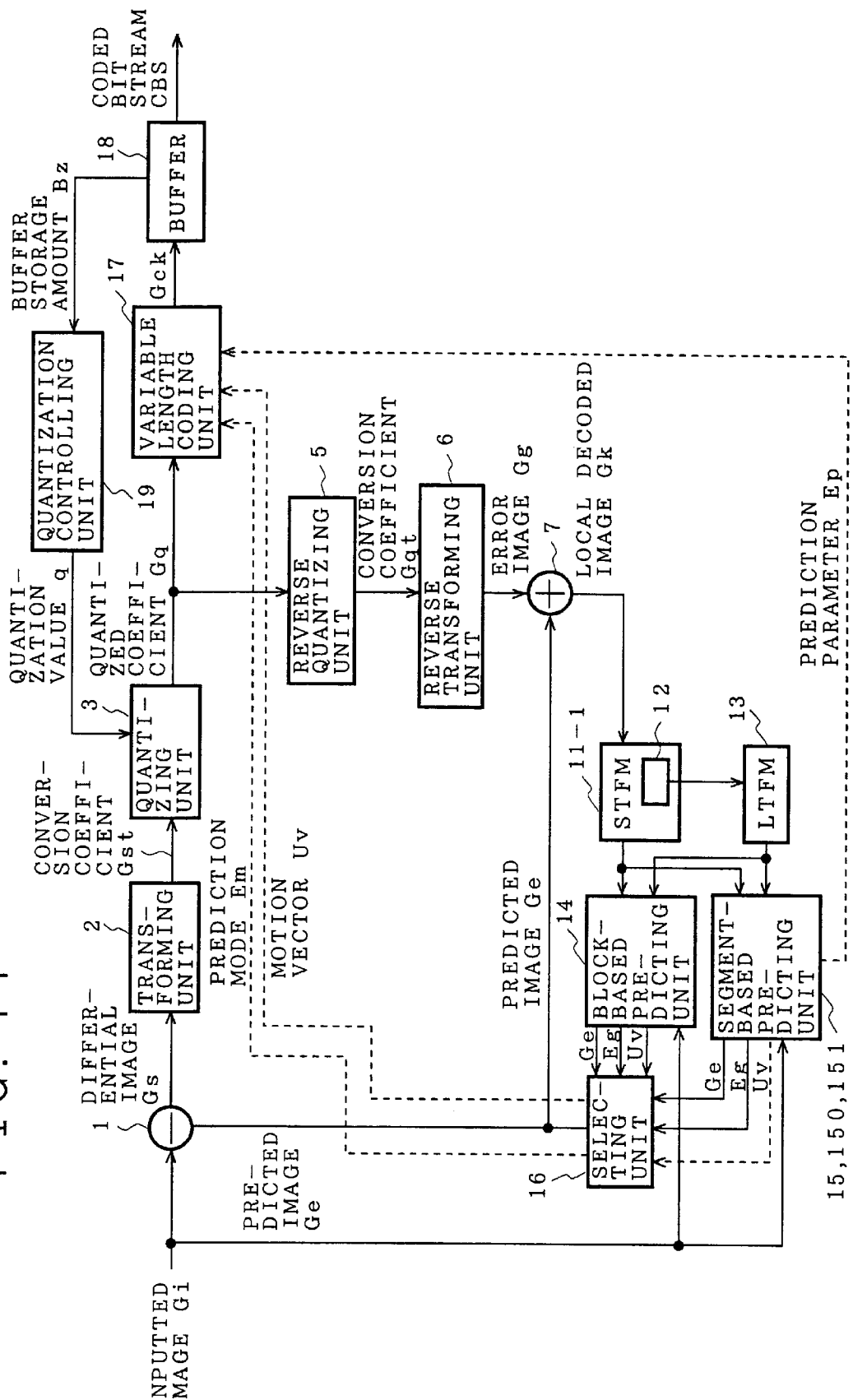
FIG. 11 is a block diagram showing an image coder in accordance with the fourth and fifth Embodiments of the present invention.

FIG. 11 is a block diagram showing an image coder in accordance with the fourth Embodiment of the present invention in which notation 11-1 designates STFM in which the delay time controlling unit 12 is integrated. Numeral 15 or 150 or 151 designates the segment-based predicting unit and according to the image coder of the fourth Embodiment the segment-based predicting unit 15 that is used in the first Embodiment is also used. Further, according to the fifth and sixth Embodiments, as mentioned later, the segment-based predicting unit 150 or 151 is used and an explanation will be given of the characteristics thereof in the fifth and sixth Embodiments. The other constituent elements thereof are the same as those in the image coder of the first Embodiment and therefore, explanation will be omitted and the same reference numerals are used.

According to the image coders of the first and second Embodiments the delay time controlling unit 12 is provided separately from STFM 11. However, the delay time controlling unit 12 may be provided inside of STFM 11-1 as illustrated in FIG. 11 with an effect similar to that of the image coders of the first and second Embodiment.

Embodiment 5.

Figure 12:
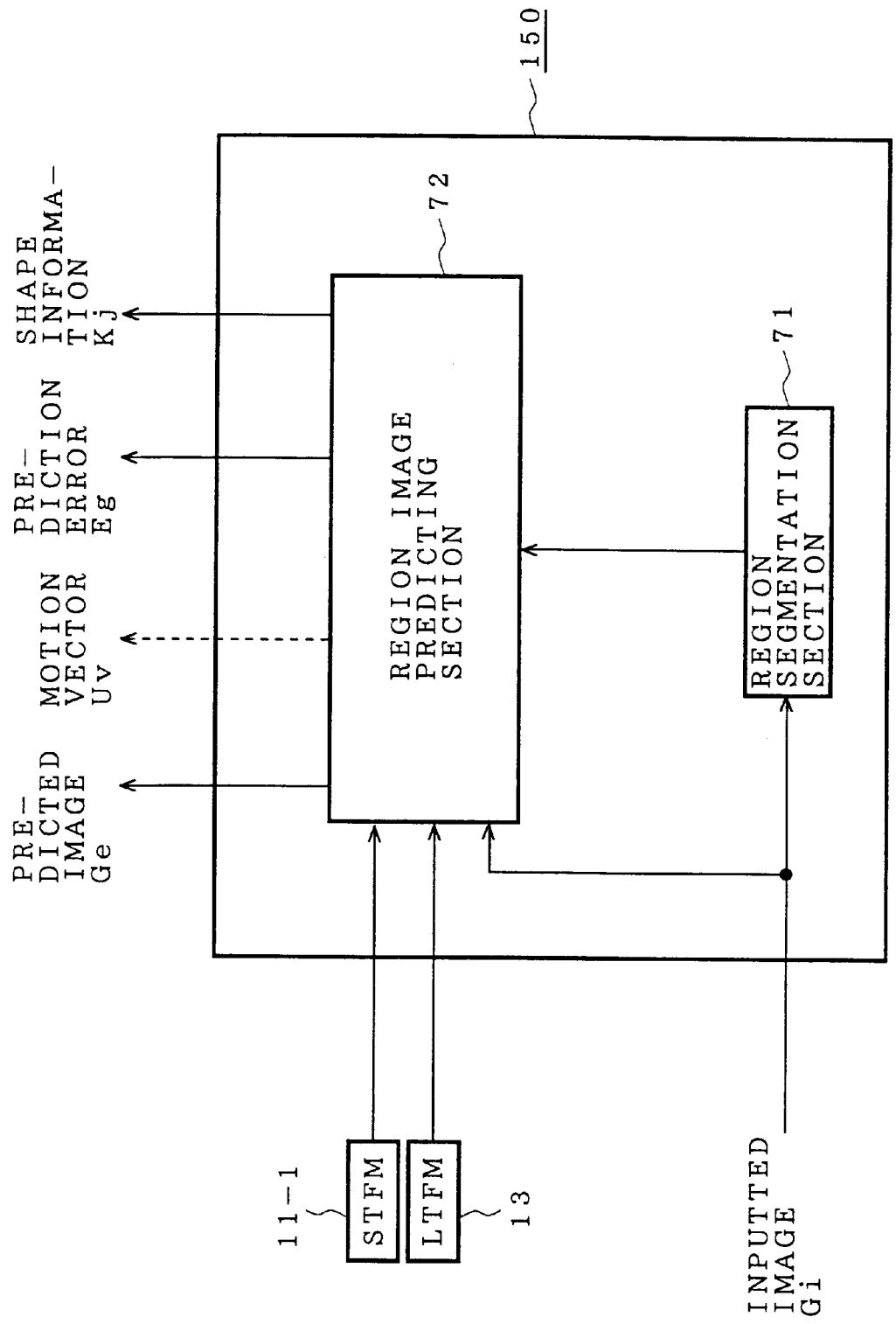
FIG. 12 is a block diagram showing a segment-based predicting unit 150 in the image coder in accordance with the fifth Embodiment of the present invention.

FIG. 12 is a block diagram showing details of the segment-based predicting unit 150 of an image coder in accordance with the fifth Embodiment of the present invention in which the constituent elements the same as those in FIG. 4 have the same reference numerals and explanation thereof will be omitted.

In FIG. 12, numeral 71 designates an region segmentation section (image dividing section) analyzing the inputted image Gi and dividing it into a plurality of segment areas and numeral 72 designates a region image predicting section executing the motion compensation for each of the segment areas divided by the region segmentation section 71.

Next, an explanation will be given of the operation of the segment-based prediction unit 150.

When the inputted image Gi is inputted to the segment-based predicting unit 150 as in the image coder of the first Embodiment, the region segmentation section 71 in the segment-based predicting unit 150 divides the inputted image Gi into a plurality of segment areas by detecting difference of shading value, edges, etc. of image in the inputted image Gi.

When the region segmentation section 71 divides the inputted image Gi into a plurality of segment areas in this way, the region image predicting section 72 generates the predicted image Ge minimizing the prediction error Eg by executing motion compensation for each of the divided segment areas in reference to the local decoded image Gk stored in STFM 11 and LTFM 13 and outputs the predicted image Ge, the prediction error Eg, the motion vector Uv and a shape information Kj.

That is, the difference between the fifth Embodiment and the first Embodiment resides in that although the predicted image selecting unit 31 and the like in the first Embodiment execute the motion compensation for each of the segment areas in the predetermined segment patterns, the region image predicting section 72 executes the motion compensation for each of the segment areas divided by the region segmentation section 71.

Owing to this difference, according to the image coder of the fifth Embodiment, the error of the predicted image Ge with respect to the inputted image Gi can be minimized even when the segment areas in the inputted image Gi are significantly different from the predetermined segment patterns.

Incidentally, as the shape information Kj outputted by the region image predicting section 72, for example, outlines of the respective segments or the like may be conceived and the shape information Kj is coded in variable length coded at the variable length coding unit 17 and is sent to an image decoder.

Embodiment 6.

Figure 13:
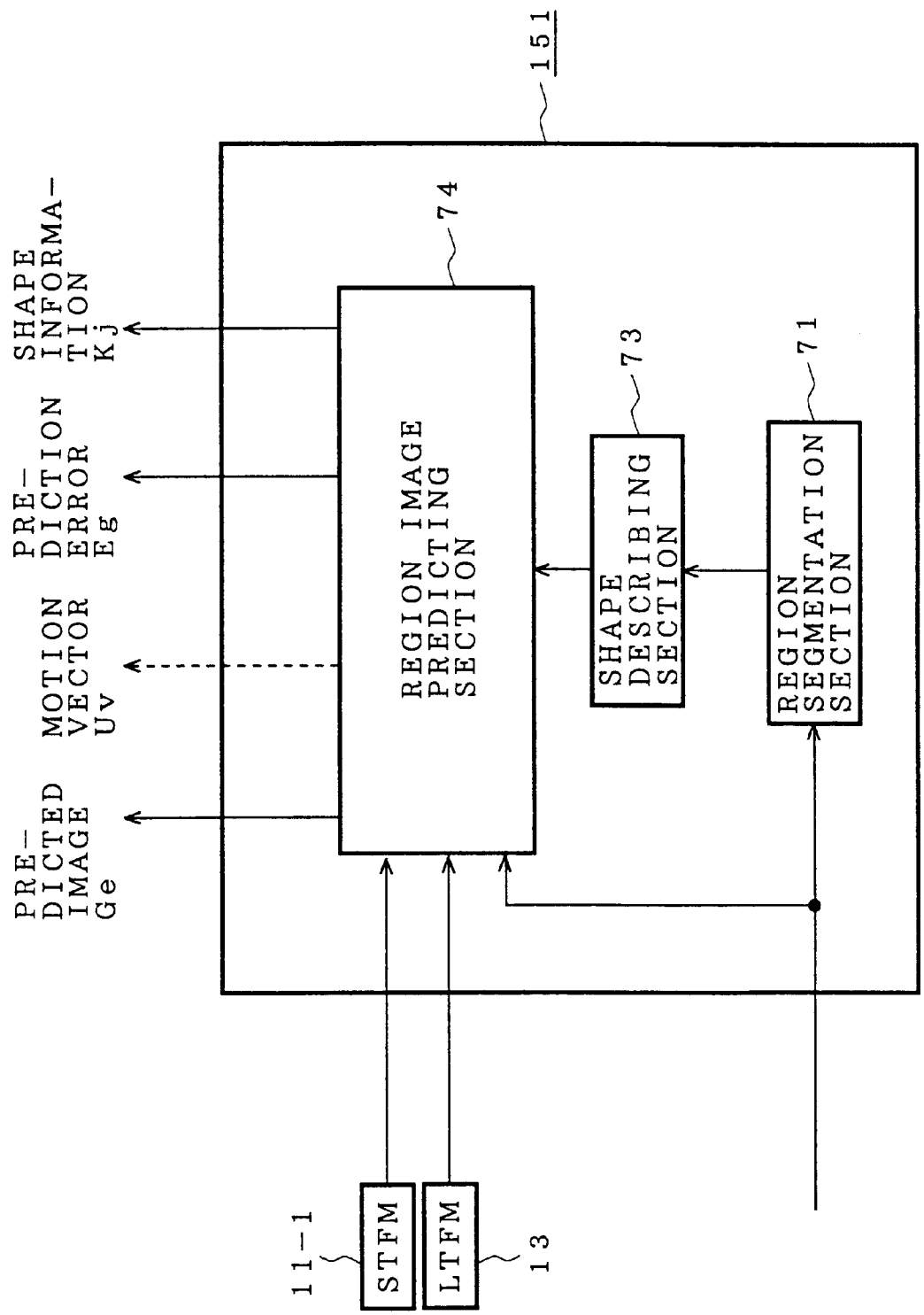
FIG. 13 is a block diagram showing details of a segment-based predicting unit 151 in an image coder in accordance with the sixth Embodiment of the present invention.

FIG. 13 is a block diagram showing the segment-based predicting unit 151 in an image coder in accordance with the sixth Embodiment of the present invention in which the constituent elements the same as those in FIG. 12 have the same reference numerals and an explanation thereof will be omitted.

Numeral 73 designates a shape describing section respectively calculating degrees of approximation of a plurality of predetermined segment patterns (area shape patterns) with respect to the inputted image Gi divided by the region segmentation unit 71 thereby extracting a segment pattern having the highest degree of approximation and numeral 74 designates a region image predicting section generating the predicted image Ge and the like by executing the motion compensation for each of the segment areas in the segment patterns extracted by the shape describing section 73.

Next, an explanation will be given of the operation of the segment-based prediction unit 151.

When the region segmentation section 71 divides the inputted image Gi into a plurality of segment areas as in the image coder of the fifth Embodiment described above, the shape describing section 73 calculates the degree of approximation for each of the plurality of predetermined segment patterns with respect to the divided inputted image Gi thereby extracting a segment pattern having the highest degree of approximation.

Figure 14:
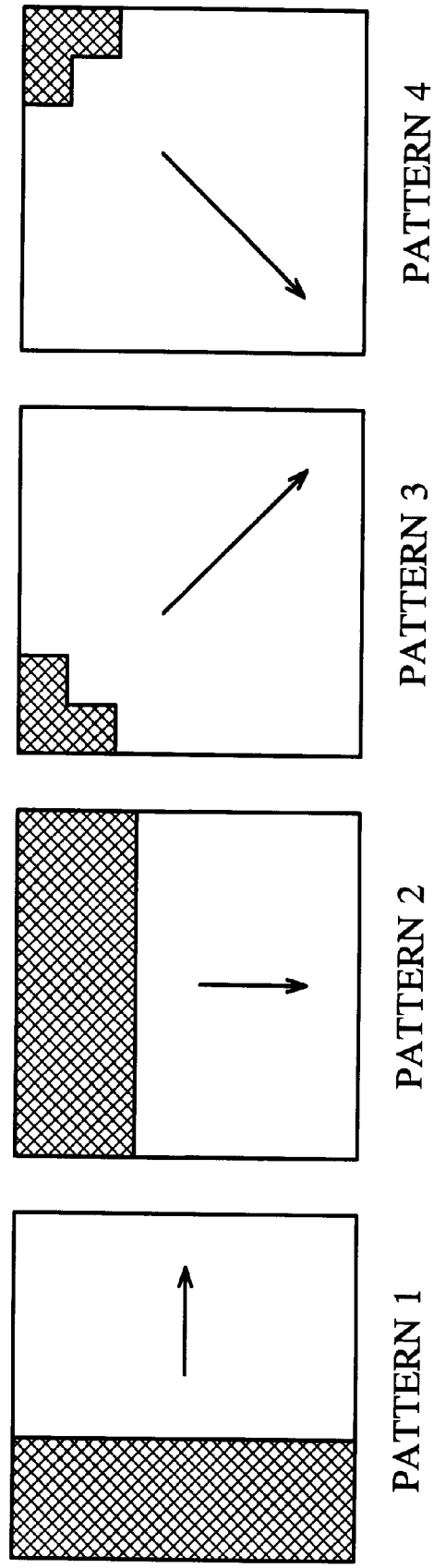
FIG. 14 illustrates segment patterns.

Specifically, in the case of FIG. 14 a segment pattern having the largest number of pixels sharing areas common to pixels in segment areas, among the segment patterns 1 through 4 (black portions in segment patterns) is extracted as the segment pattern having the highest degree of approximation.

Further, after extracting the segment pattern having the highest degree of approximation, a level is extracted to specify the shape of each segment area in the segment pattern.

For example, when the segment pattern 3 is extracted as the segment pattern having the highest degree of approximation, the level is extracted based on the number of pixels in common areas, etc. since N of levels are set therein (two levels are exemplified in FIG. 15).

The relation of similarity in the shape of the segment area is maintained in the same segment pattern even if the levels are different. Further, the number of levels differs depending on each segment pattern.

When the segment pattern and the level are extracted in this way, the region image predicting section 74 generates the predicted image Ge minimizing the prediction error Eg by executing the motion compensation for each of segment areas in the extracted segment pattern and outputs the predicted image Ge, the prediction error Eg, the motion vector Uv and the shape information Kj. Incidentally, the shape information Kj is constituted by the extracted segment pattern and level.

As has been explained, according to the image coder of the sixth Embodiment; the error of the predicted image Ge the respect to the inputted image Gi can be decreased even when the segment areas of the divided inputted image Gi are significantly different from the predetermined segment patterns.

Embodiment 7.

Figure 16:
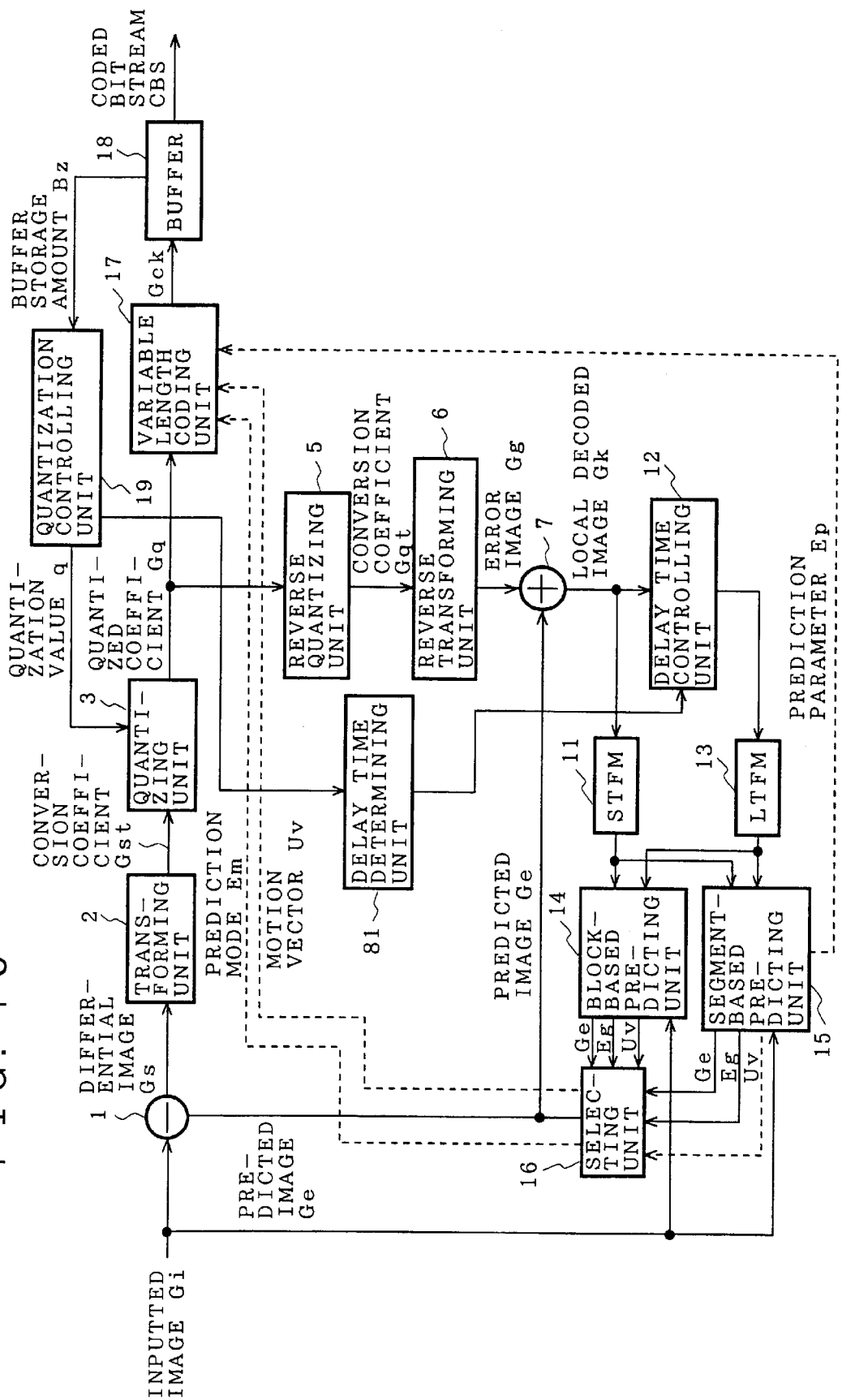
FIG. 16 is a block diagram showing an image coder in accordance with the seventh Embodiment of the present invention.

FIG. 16 is a block diagram showing an image coder in accordance with the seventh Embodiment of the present invention in which portions the same as the constituent elements of the image coder illustrated in FIG. 2 have the same reference numerals and an explanation thereof will be omitted.

In FIG. 16, numeral 81 designates a delay time determining unit controlling the delay of storing time of LTFM 13 with respect to STFM 11 in accordance with the buffer storage amount (storage amount of the variable length code Gck) of the buffer 18.

Next, an explanation will be given of the operation of the image coder of the seventh Embodiment.

The variable length code Gck which has been variable length coded by the variable length coding unit 17 is stored in the buffer 18 and when the amount of storage exceeds a threshold value, the variable length code Gck is sent to an image decoder as the coded bit stream CBS as in the case of the first Embodiment. However, the delay time determining unit 81 may control the delay of the storing time of LTFM 13 with respect to STFM 11 in accordance with the buffer storage amount Bz of the buffer 18. That is, the quantization controlling unit 19 increases the quantization value q of the quantizing unit 3 to restrain the amount of information when the buffer storage amount Bz in the buffer 18 is decreased. Further, when the delay time determining unit 81 decreases the delay of the storing time of LTFM 13 in respect of STFM 11, the distance between the reference frames is decreased and the correlation over time between the inputted image Gi and the local decoded image Gk is enhanced. The amount of generating information can be restrained in this way.

Meanwhile, the quantization controlling unit 19 sets to decreases the quantization value q of the quantizing unit 3 to increase the amount of information when the buffer storage amount Bz in the buffer 18 is increased. Further, when the delay time determining unit 81 increases the delay of the storing time of LTFM 13 in respect of STFM 11, the distance between the reference frames is increased whereby the correlation over time between the inputted image Gi and the local decoded image Gk is reduced. The amount of generating information can be increased in this way.

Embodiment 8.

Figure 17:
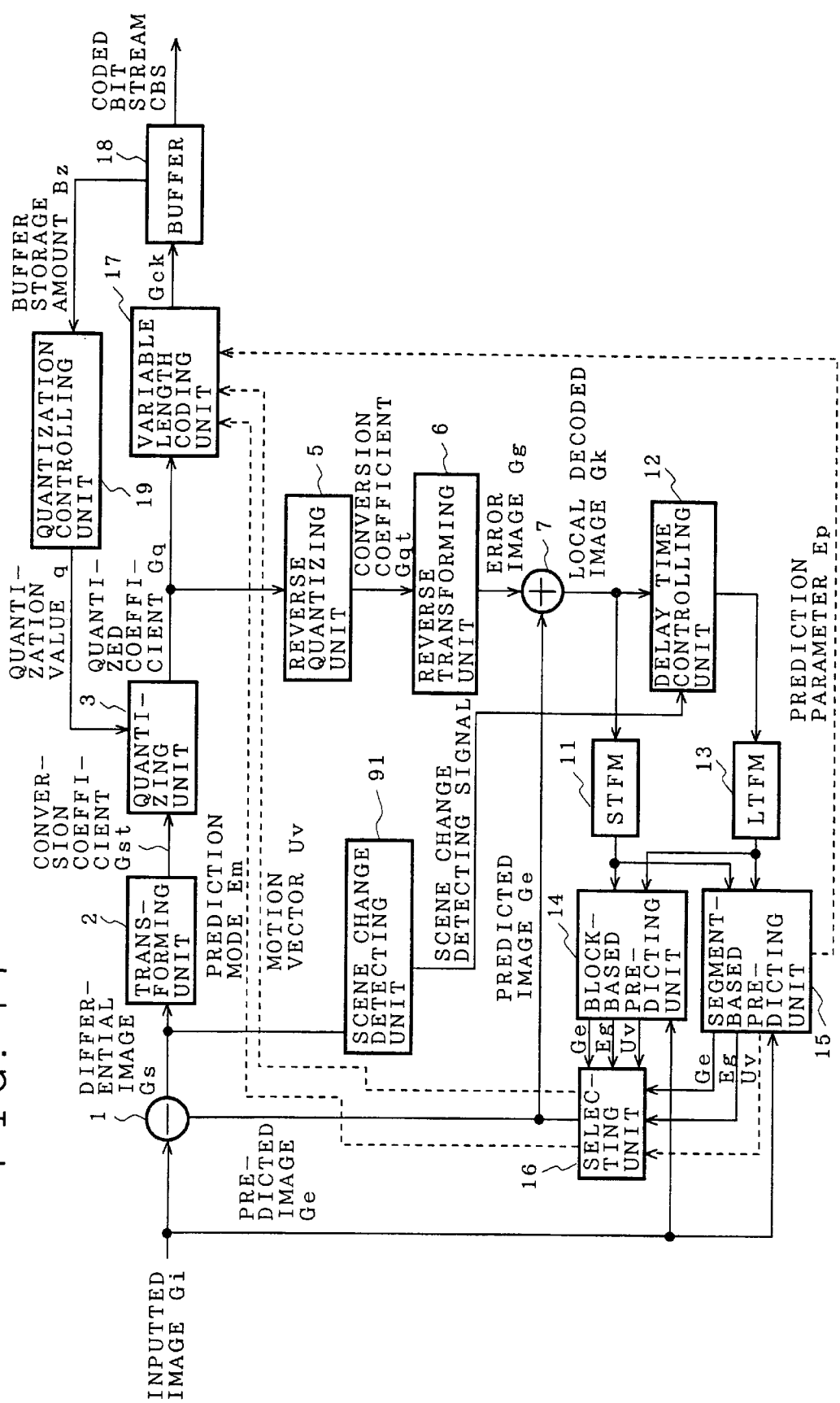
FIG. 17 is a block diagram showing an image coder in accordance with the eighth Embodiment of the present invention.

FIG. 17 is a block diagram showing an image coder in accordance with the eighth Embodiment of the present invention in which portions the same as the constituent elements of the image coder illustrated in FIG. 2 have the same reference numerals and an explanation thereof will be omitted.

Numeral 91 designates a scene change detecting unit detecting a scene change based on the differential image Gs produced by subtracting the predicted image Ge from the inputted image Gi and storing the local decoded image Gk outputted from the adder 7 to LTFM 13 when the scene change is detected.

Next, an explanation will be given of the operation of the image coder of the eighth Embodiment.

Although the local decoded image Gk is stored in LTFM 13 after it is delayed by the delay time controlling unit 12 by a predetermined period of time in the image coder of the first Embodiment, the local decoded image Gk outputted from the adder 7 may be stored in LTFM 13 when the scene change detecting unit 91 detects a scene change based on the differential image Gs produced by subtracting the predicted image Ge from the inputted image Gi.

That is, the scene change detecting unit 91 calculates the dispersion of the differential image Gs or the summation of the absolute values of pixel values, determines that the scene change occurs when these are larger than threshold values and outputs a scene change detecting signal S to the delay time controlling unit 12.

Next, when the scene change detecting signal S is outputted from the scene change detecting unit 91, the delay time controlling unit 12 stores the local decoded image Gk currently outputted from the adder 7 to LTFM 13.

However, when the scene change detecting unit 91 does not detect scene change, the local decoded image Gk is stored to LTFM 13 at timings similar to those in the first Embodiment.

In this way, according to the image coder of the eighth Embodiment the local decoded image Gk before the scene change occurs, which has an extremely low correlation with respect to the inputted image Gi can be prevented from storing to LTFM 13 and therefore, the error of the predicted image Ge in respect of the predicted image Gi can be reduced.

Embodiment 9.

Figure 18:
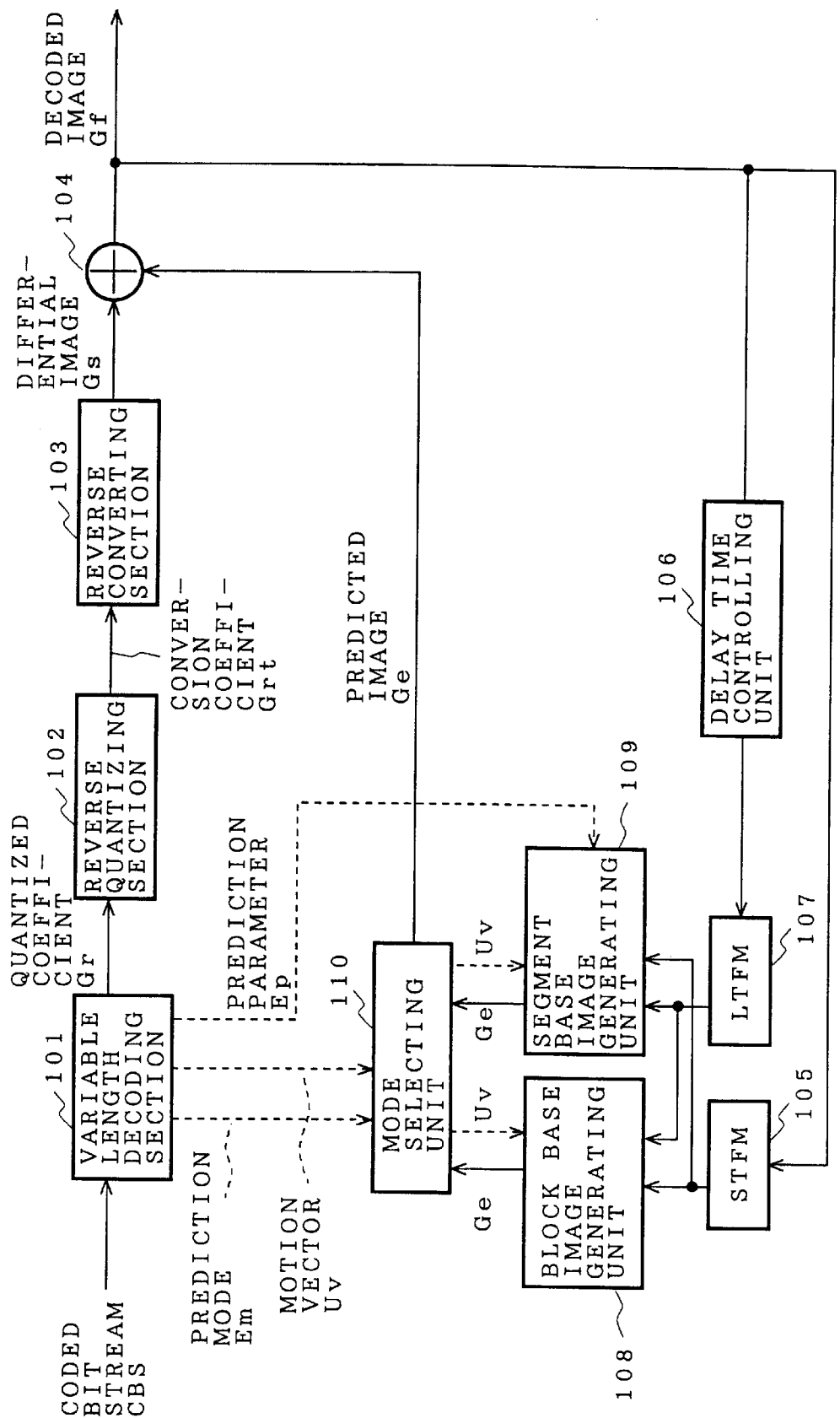
FIG. 18 is a block diagram showing an image decoder in accordance with the ninth Embodiment of the present invention.
Figure 19:
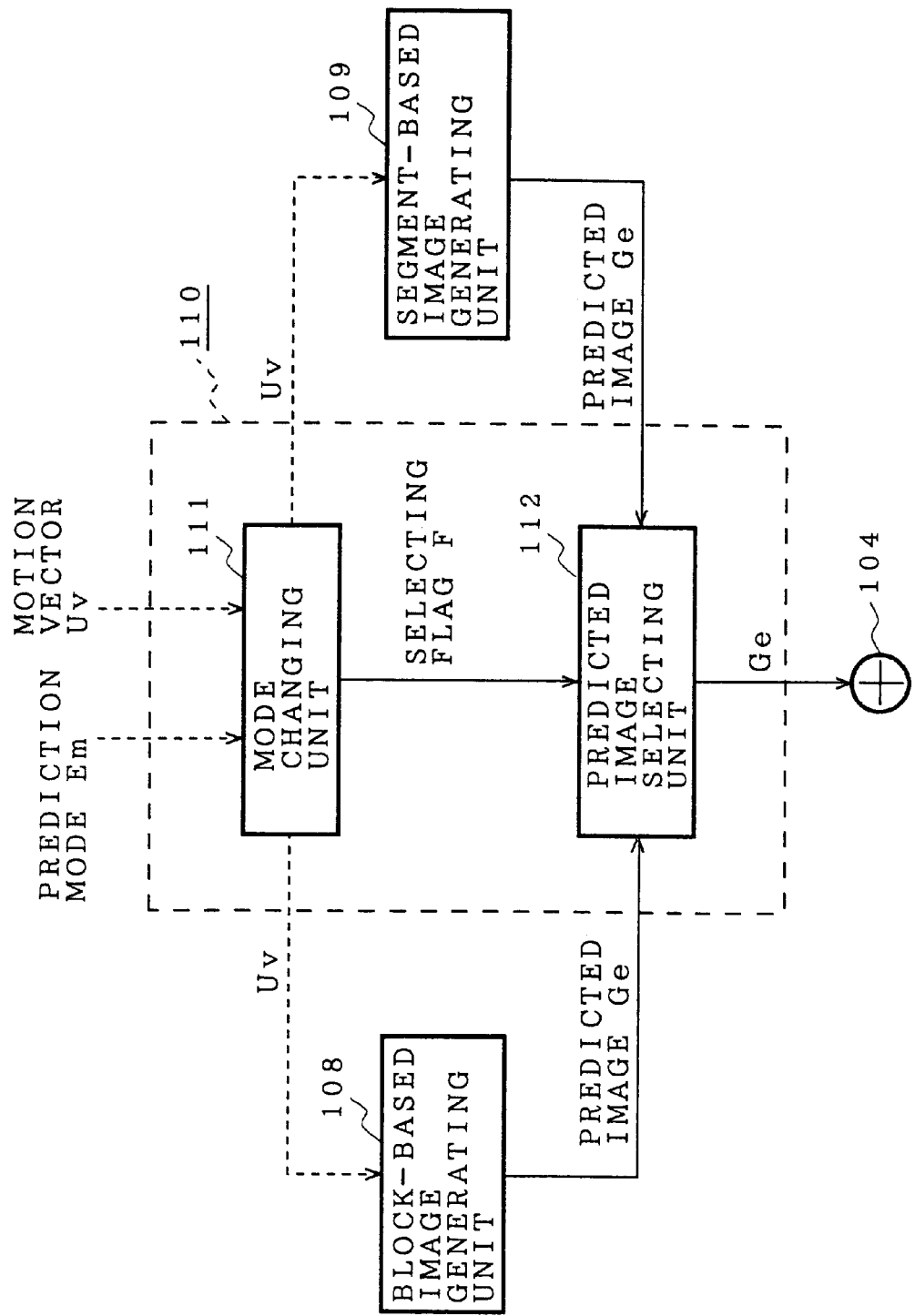
FIG. 19 is a block diagram showing a mode selecting unit 110 in the image decoder of the ninth Embodiment illustrated in FIG. 18.

FIG. 18 is a block diagram showing an image decoder in accordance with ninth Embodiment of the present invention. In FIG. 19, numeral 101 designates a variable length decoding section decoding in variable length the coded bit stream CBS sent from an image coder and outputting a quantized coefficient Gr, numeral 102 designates a reverse quantizing section reverse-quantizing the quantized coefficient Gr outputted from the variable length decoding section 101 and outputting a conversion coefficient Grt, numeral 103 designates a reverse converting section converting by the reverse discrete cosine transformation the conversion coefficient Grt outputted from the reverse quantizing section 102 and reproducing the differential image Gs and numeral 104 designates an adder generating a decoded image Gf by adding the predicted image Ge to the differential image Gs reproduced by the reverse converting section 103.

Further, numeral 105 designates STFM storing the decoded image Gf outputted from the adder 104, numeral 106 designates a delay time controlling unit temporarily holding the decoded image Gf outputted from the adder 104 and storing the decoded image Gf to LTFM 107 after the elapse of a predetermined period of time since the decoded image Gf has been outputted from the adder 104 and numeral 107 designates LTFM storing the decoded image Gf outputted from the adder 104 a predetermined period of time earlier than the decoded image Gf stored to STFM 105. Numeral 108 designates a block-based image generating unit generating the predicted image Ge based on the decoded image Gf in the unit of frame that is stored by STFM 105 or LTFM 107 and the motion vector Uv decoded by the variable length decoding section 101, numeral 109 designates a segment-based image generating unit generating the predicted image Ge based on the decoded image Gf in the unit of segment area stored in STFM 105 or LTFM 107 and the motion vector Uv and the prediction parameter Ep which are decoded by the variable length decoding section 101 and numeral 110 designates a mode selecting unit selecting either one of the predicted image Ge generated by the block-based image generating unit 108 and the predicted image Ge generated by the segment-based image generating unit 109.

FIG. 19 is a block diagram showing the mode selecting unit 110. In FIG. 19, numeral 111 designates a mode changing unit outputting the motion vector Uv to either one of the block-based image generating unit 108 and the segment-based image generating unit 109 based on the prediction mode Em and outputting a selecting flag F indicating a portion to which the motion vector Uv is outputted and numeral 112 designates a predicted image selecting unit outputting the predicted image Ge outputted from either one of the block-based image generating unit 108 and the segment-based image generating unit 109 to the adder 104 based on the selecting flag F outputted from the mode changing unit 111.

Next, an explanation will be given of the operation of the image decoder of the ninth Embodiment.

First, when the coded bit stream CBS is sent from an image coder, the variable length decoding section 101 in variable length decodes the coded bit stream CBS and outputs the quantized coefficient Gr, the prediction mode Em, the motion vector Uv and the prediction parameter Ep. Next, when the quantized coefficient Gr is outputted from the variable length decoding section 101, the reverse quantizing section 102 reverse-quantizes the quantized coefficient Gr and outputs the conversion coefficient Grt and the reverse converting section 103 converts, by reverse discrete cosine transformation, the conversion coefficient Grt whereby the differential image Gs is reproduced.

Next, the adder 104 generates the decoded image Gf by adding the predicted image Ge to the differential image Gs.

When the decoded image Gf is outputted from the adder 104, STFM 105 immediately stores the decoded image Gf and LTFM 107 stores the decoded image Gf which is delayed by a predetermined period of time by the delay time controlling unit 106 similar to STFM 11 and LTFM 13 in the first Embodiment.

Meanwhile, when the prediction mode Em and the motion vector Uv are outputted from the variable length decoding section 101, the mode changing unit 111 in the mode selecting unit 110 analyzes the prediction mode Em and outputs the motion vector Uv to the block-based image generating unit 108 if the prediction mode Em indicates that the predicted image Ge inputted to the subtracter 1 of an image coder relates to the predicted image Ge generated by the block-based predicting unit 14.

In contrast, when the prediction mode Em indicates that the predicted image Ge inputted to the subtracter 1 of the image coder relates to the predicted image Ge generated by the segment-based predicting unit 15, the motion vector Uv is outputted to the segment-based image generating unit 109.

Further, the selecting flag F, indicating a portion to which the motion vector Uv is outputted, is outputted to the predicted image selecting unit 112.

Next, when the motion vector Uv is outputted from the mode changing unit 111 to the block-based image generating unit 108, the block-based image generating unit 108 generates the predicted image Ge based on the decoded image Gf in the unit of frame which is stored in STFM 105 or LTFM 107 and the motion vector Uv.

Further, when the motion vector Uv is outputted from the mode changing unit 111 to the segment-based image generating unit 109, the segment-based image generating unit 109 generates the predicted image Ge based on the decoded image Gf in the unit of segment area which is stored in STFM 105 or LTFM 107, the motion vector Uv and the prediction parameter Ep. That is, the predicted image Ge is generated by a pertinent combination of the decoded image Gf in the unit of segment area and the like.

Figure 20:
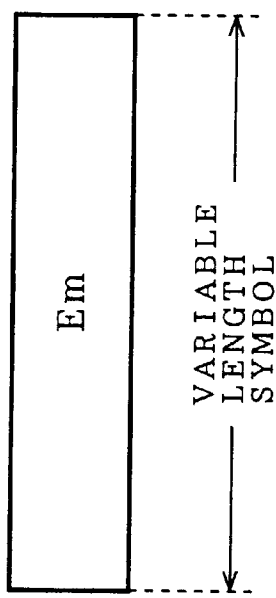
FIG. 20 illustrates a prediction mode Em.

Incidentally, the prediction mode Em includes information of the so-called prediction mode and image frames to each of which a variable length code is illustrated in FIG. 20.

When the selecting flag F indicates the block-based image generating unit 108 as the portion to which the motion vector Uv is outputted, the predicted image selecting unit 112 outputs the predicted image Ge generated by the block-based image generating unit 108 to the adder 104.

When the selecting flag F indicates the segment-based image generating unit 109 as the portion to which the motion vector Uv is outputted, the predicted image selecting unit 112 outputs the predicted image Ge generated by the segment-based image generating unit 109 to the adder 104.

Thereby, the image decoder of the ninth Embodiment achieves an effect whereby the decoded image Gf can accurately be generated from the coded bit stream CBS sent from the image coder of each of the first through the eighth Embodiments.

Embodiment 10.

Although the above-described image decoder of the ninth Embodiment does not include the shape information Kj in the coded bit stream CBS, when the shape information Kj is included in the coded bit stream CBS as in the image coder of the fifth Embodiment, or the like, the variable length decoding unit 101 may variable length decode the shape information Kj and output it to the segment-based image generating unit 109 and the segment-based image generating unit 109 may generate the predicted image Ge considering the shape information Kj.

As has been explained in detail, according to the present invention, the second storing means for storing the local decoded image generated by the local decoded image generating means a predetermined period of time earlier than the local decoded image stored to the first storing means, is provided and the motion compensation of the inputted image is executed in reference to the local decoded image stored in the first and the second storing means. Therefore, even in the case where although a background image is hidden at the back of an object in one of the local decoded image stored in the first storing means, the background image emerges at the back of the object in a currently inputted image, a local decoded image having a time-sequential shift in respect of a local decoded image stored in the first storing means can be secured in the second storing means and therefore, the possibility of providing a reference image in which the background image is present at the back of the object is promoted whereby the coding accuracy of the image coder is increased.

Also, according to the present invention, the first predicting unit for executing motion compensation for each frame of the inputted image in reference to the local decoded image stored in the first and second storing means and the second predicting unit for executing the motion compensation for each segment area constituting the frame of the inputted image in reference to the local decoded image stored in the first and second storing means, are provided and therefore, the error of the predicted image in respect of the inputted image can be reduced even when a plurality of objects present in one frame of the inputted image move differently from each other.

Further, according to the present invention, the image dividing unit for analyzing the inputted image and dividing it into a plurality of segment areas, is provided and therefore, the error of the predicted image in respect of the inputted image can be reduced even when the segment areas of the inputted image are significantly different from the predetermined segment patterns.

According to the present invention, the degree of approximation of each of a plurality of area shape patterns in respect of inputted image divided by the image dividing unit is respectively calculated, an area shape pattern having the highest degree of approximation is extracted and the motion compensation is executed for each of the segment areas constituting the area shape pattern having the highest degree of approximation and therefore, the error of the predicted image in respect of the inputted image can be reduced even when segment areas of the divided inputted image are significantly different from the predetermined segment patterns.

According to the present invention, the differential image and the motion vector coded by the coding means are stored and the quantization value of the local decoded image generating means is controlled in accordance with the amount of storage and therefore, the coded bit stream can be outputted to an image decoder at a constant bit rate.

According to the present invention, the delay of storing time of the second storing means in respect of the first storing means is controlled in accordance with the amount of storage of the differential image and the motion vector which are stored by the quantization controlling means and therefore, the coded bit stream can be outputted to an image decoder at a constant bit rate.

According to the present invention; a scene change is detected based on the differential image produced by subtracting the predicted image from the inputted image and when the scene change is detected, the local decoded image generated by the local decoded image generating means is stored to the second storing means and therefore, the local decoded image before the occurrence of the scene change which has an extremely low correlation with the inputted image can be prevented from storing to the second storing means and as a result, the error of the predicted image in respect of the inputted image can be reduced.

According to the present invention, the second storing means for storing the decoded image generated by the decoded image generating means a predetermined period of time earlier than the decoded image stored to the first storing means, is provided and the predicted image is generated based on the decoded image stored in the first or the second storing means and the motion vector decoded by the decoded image generating means and therefore, the decoded image can be generated accurately from the coded bit stream sent from the image coder of the present invention.

According to the present invention, when the image coder executes the motion compensation for each of the segment areas, the predicted image is generated by combining the decoded image of the respective segment areas stored by the first or the second storing means and therefore, the decoded image can be generated accurately from the coded bit stream sent from the image coder of the present invention.

What is claimed is:

1. An image coder comprising:
   a local decoded image generator, quantizing a differential image produced by subtracting a predicted image from one of a series of inputted images, reverse-quantizing the quantized differential image and generating a local decoded image by adding the predicted image to the reverse-quantized differential image;
   a first memory, storing a first local decoded image generated by said local decoded image generator;
   a second memory, storing a second local decoded image generated by said local decoded image generator wherein only one of the first local decoded image and the second local decoded image contains a particular background image portion, in order to ensure two different reference images are stored;
   a predictor, determining the predicted image and a motion vector by executing motion compensation for the series of inputted images with reference to the first or second local decoded images stored by said first and second memories; and
   a coder, coding the quantized differential image from said local decoded image generator and the motion vector determined by said predictor.

2. The image coder of claim 1, wherein said predictor further includes,
   a first predicting unit, generating a first predicted image, the motion vector and a first prediction error by executing the motion compensation for each block constituting a frame of the series of inputted images with reference to the first local decoded image stored by said first memory;
   a second predicting unit, generating a second predicted image, the motion vector and a second prediction error by executing the motion compensation for each segment area constituting the frame of the series of inputted images with reference to the second local decoded image stored by said second memory; and
   a selecting unit, calculating a deviation between the first prediction error generated by said first predicting unit and the second prediction error generated by said second predicting unit and selecting either the first predicted image generated by said first predicting unit or the second predicted image generated by said second predicting unit in accordance with the deviation and the motion vector corresponding to a value of the deviation.

3. The image coder of claim 2, wherein said second predicting unit includes an image dividing unit analyzing the series of inputted images and dividing the inputted image into a plurality of segment areas.

4. The image coder of claim 3, wherein said second predicting unit calculates a degree of approximation between each of a plurality of area shape patterns and the inputted image divided by said image dividing unit, extracts one of the plurality of area shape patterns having a highest degree of approximation and executes the motion compensation for each of the plurality of segment areas constituting the one of the plurality of area shape patterns having the highest degree of approximation.

5. The image coder of claim 1, further comprising a quantization controller storing the differential image and the motion vector coded by said coder and controlling a quantization value of said local decoded image generator in accordance with a storage amount thereof.

6. The image coder of claim 2, further comprising a quantization controller storing the differential image and the motion vector coded by said coder and controlling a quantization value of said local decoded image generator in accordance with a storage amount thereof.

7. The image coder of claim 3, further comprising a quantization controller storing the differential image and the motion vector coded by said coder and controlling a quantization value of said local decoded image generator in accordance with a storage amount thereof.

8. The image coder of claim 4, further comprising a quantization controller storing the differential image and the motion vector coded by said coder and controlling a quantization value of said local decoded image generator in accordance with a storage amount thereof.

9. The image coder of claim 5, further comprising a delay time controller controlling a storing time delay of said second memory with respect to said first memory in accordance with the storage amount of the differential image and the motion vector both stored by said quantization controller.

10. The image coder of claim 6, further comprising a delay time controller controlling a storing time delay of said second memory with respect to said first memory in accordance with the storage amount of the differential image and the motion vector both stored by said quantization controller.

11. The image coder of claim 1, further comprising a scene change detector detecting a scene change based on the differential image produced by subtracting the predicted image from one of the series of inputted images and storing the local decoded image generated by said local decoded image generator in said second memory when said scene change detector detects the scene change.

12. The image coder of claim 2, further comprising a scene change detector detecting a scene change based on the differential image produced by subtracting the predicted image from one of the series of inputted images and storing the local decoded image generated by said local decoded image generator in said second memory when said scene change detector detects the scene change.

13. The image coder of claim 3, further comprising a scene change detector detecting a scene change based on the differential image produced by subtracting the predicted image from one of the series of inputted images and storing the local decoded image generated by said local decoded image generator in said second memory when said scene change detector detects the scene change.

14. The image coder of claim 4, further comprising a scene change detector detecting a scene change based on the differential image produced by subtracting the predicted image from one of the series of inputted images and storing the local decoded image generated by said local decoded image generator in said second memory when said scene change detector detects the scene change.

15. The image coder of claim 5, further comprising a scene change detector detecting a scene change based on the differential image produced by subtracting the predicted image from one of the series of inputted images and storing the local decoded image generated by said local decoded image generator in said second memory when said scene change detector detects the scene change.

16. The image coder of claim 9, further comprising a scene change detector detecting a scene change based on the differential image produced by subtracting the predicted image from one of the series of inputted images and storing the local decoded image generated by said local decoded image generator in said second memory when said scene change detector detects the scene change.

17. An image decoder comprising:
   a decoded image generator, generating a series of decoded images by decoding a previously coded differential image and a motion vector, reverse-quantizing the decoded differential image and adding a predicted image to the reverse-quantized differential image;
   a first memory, storing a first decoded image generated by said decoded image generator;
   a second memory, storing a second decoded image generated by said decoded image generator wherein only one of the first local decoded image and the second local decoded image contains a particular background image portion, in order to ensure two different reference images are stored; and
   a predicted image generator, generating the predicted image based on the first or second decoded images stored in said first or said second memories and the motion vector decoded by said decoded image generator.

18. The image decoder of claim 17, wherein when an image coder has executed motion compensation for each of a plurality of segment areas of the previously coded differential image, said predicted image generator generates the predicted image by combining the decoded image for each of the plurality of segment areas stored by said first and said second memories.

19. The image coder of claim 1, wherein the image portion is a background.

20. The image coder of claim 1, wherein the image portion includes a moving object.

21. The image decoder of claim 17, wherein the image portion is a background.

22. The image decoder of claim 17, wherein the image portion includes a moving object.

23. An image coder comprising:
   a local decoded image generator, generating first and second local decoded images from a series of inputted images wherein only one of the first local decoded image and the second local decoded image contains a particular background image portion, in order to ensure two different reference images are stored;

a first memory, storing the first local decoded image generated by said local decoded image generator;

a second memory, storing the second local decoded image generated by said local decoded image generator;

a predictor, determining a predicted image and a motion vector by executing motion compensation for the series of inputted images with reference to the first or second local decoded images stored by said first and second memories; and a coder, coding a quantized differential image from the first or second local decoded images generated by said local decoded image generator and the motion vector determined by said predictor.

24. The image coder of claim 23, wherein the image portion is a background.

25. The image coder of claim 23, wherein the image portion includes a moving object.

26. An image decoder comprising:

a decoded image generator, generating first and second decoded images from a series of inputted images wherein only one of the first local decoded image and the second local decoded image contains a particular background image portion, in order to ensure two different reference images are stored and generating a motion vector;

a first memory storing the first decoded image generated by said decoded image generator;

a second memory storing the second decoded image generated by said decoded image generator; and a predicted image generator, generating a predicted image based on the first or second decoded images stored in said first or said second memories and the motion vector decoded by said decoded image generator.

27. The image decoder of claim 26, wherein the image portion is a background.

28. The image decoder of claim 26, wherein the image portion includes a moving object.

* * * * *